US011698903B2

(12) United States Patent
Wildenradt et al.

(10) Patent No.: US 11,698,903 B2
(45) Date of Patent: *Jul. 11, 2023

(54) VISUALLY DEFINING MULTI-ROW TABLE CALCULATIONS IN A DATA PREPARATION APPLICATION

(71) Applicant: Tableau Software, Inc., Seattle, WA (US)

(72) Inventors: Clark Wildenradt, Seattle, WA (US); Arthur Gyldenege, Seattle, WA (US)

(73) Assignee: Tableau Software, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/409,717

(22) Filed: Aug. 23, 2021

(65) Prior Publication Data

US 2021/0382879 A1 Dec. 9, 2021

Related U.S. Application Data

(63) Continuation of application No. 16/681,753, filed on Nov. 12, 2019, now Pat. No. 11,100,097.

(51) Int. Cl.
*G06F 16/242* (2019.01)
*G06F 16/22* (2019.01)
*G06F 16/28* (2019.01)

(52) U.S. Cl.
CPC .......... *G06F 16/244* (2019.01); *G06F 16/221* (2019.01); *G06F 16/2282* (2019.01); *G06F 16/287* (2019.01)

(58) Field of Classification Search
CPC ........ G06F 11/323; G06F 3/048; G06F 16/26; G06F 9/451; G06F 16/9038;
(Continued)

(56) References Cited

U.S. PATENT DOCUMENTS 4,357,673 A 11/1982 Willis et al.
4,458,323 A 7/1984 Willis et al.
(Continued)

OTHER PUBLICATIONS

Anonymous, "Cursor (databases) Wikipidia, the free enclclopedia," Dec. 2, 2012, XP055222764, Retrieved from the internet: https://en.wikipedia.org/wiki/Cursor_(databases), 7 pgs.
(Continued)

*Primary Examiner* — Hung T Vy
(74) *Attorney, Agent, or Firm* — Morgan, Lewis & Bockius LLP

(57) ABSTRACT

A method executes at a computing device that includes a display. The device displays a user interface that includes a data flow pane and a calculation pane, the data flow pane including a node/link diagram for a data prep flow. A user selects a node in the diagram, and the device populates affordances in the calculation pane according to data fields of a data set associated with the selected node. A first user input specifies grouping on a first data field, and a second user input specifies an aggregation function on a second data field. In response to the user inputs, for each distinct value of the first data field, the device aggregates corresponding values of the second data field according to the aggregation function. Calculated data values are displayed in the calculation pane. The device saves rows of data displayed in the calculation pane as a new data source.

22 Claims, 26 Drawing Sheets

(58) Field of Classification Search
CPC .... G06F 16/904; G06F 3/0481; G06F 3/0484; G06F 16/244; G06F 16/221
USPC .................. 707/737, 756; 717/128; 715/765
See application file for complete search history.

(56) References Cited

U.S. PATENT DOCUMENTS

| | | | |
|---|---|---|---|
| 5,339,392 | A | 8/1994 | Risberg et al. |
| 5,421,008 | A | 5/1995 | Banning |
| 6,778,873 | B1 | 8/2004 | Wang et al. |
| 6,993,553 | B2 | 1/2006 | Kaneko et al. |
| 7,362,718 | B2 | 4/2008 | Kakivaya et al. |
| 7,720,779 | B1 | 5/2010 | Perry et al. |
| 7,793,160 | B1 | 9/2010 | McClure et al. |
| 7,991,723 | B1 | 8/2011 | Dubrovky et al. |
| 8,479,136 | B2 | 7/2013 | Hopkins et al. |
| 8,843,959 | B2 | 9/2014 | McMaster et al. |
| 10,204,173 | B2 | 2/2019 | Vaught |
| 10,275,545 | B2 | 4/2019 | Yeager et al. |
| 10,339,681 | B2 | 7/2019 | Moore |
| 2002/0070953 | A1* | 6/2002 | Barg ............... G06Q 30/02 715/700 |
| 2003/0167265 | A1 | 9/2003 | Corynen |
| 2003/0220928 | A1 | 11/2003 | Durand et al. |
| 2004/0034616 | A1 | 2/2004 | Witkowski et al. |
| 2005/0010877 | A1 | 1/2005 | Udler |
| 2006/0143534 | A1 | 6/2006 | Dall |
| 2006/0168205 | A1 | 7/2006 | Barron et al. |
| 2006/0173812 | A1 | 8/2006 | Bahl et al. |
| 2006/0247912 | A1 | 11/2006 | Suzuki |
| 2007/0150581 | A1 | 6/2007 | Banerjee et al. |
| 2007/0198312 | A1 | 8/2007 | Bagchi et al. |
| 2007/0214136 | A1 | 9/2007 | MacLennan et al. |
| 2007/0288899 | A1 | 12/2007 | Fanning et al. |
| 2008/0059563 | A1 | 3/2008 | Backmann et al. |
| 2008/0140688 | A1 | 6/2008 | Clayton et al. |
| 2008/0155440 | A1 | 6/2008 | Trevor et al. |
| 2008/0159317 | A1 | 7/2008 | Iselborn et al. |
| 2008/0183687 | A1 | 7/2008 | Law |
| 2008/0195626 | A1 | 8/2008 | Ukigawa et al. |
| 2008/0209392 | A1 | 8/2008 | Able et al. |
| 2008/0254430 | A1 | 10/2008 | Woolf et al. |
| 2008/0262988 | A1 | 10/2008 | Williams et al. |
| 2008/0281801 | A1 | 11/2008 | Larson et al. |
| 2009/0018996 | A1 | 1/2009 | Hunt et al. |
| 2009/0021767 | A1 | 1/2009 | Fujimaki |
| 2009/0276724 | A1 | 11/2009 | Rosenthal et al. |
| 2009/0319688 | A1 | 12/2009 | Mason et al. |
| 2010/0057618 | A1 | 3/2010 | Spicer et al. |
| 2010/0156889 | A1 | 6/2010 | Martinez et al. |
| 2011/0283242 | A1 | 11/2011 | Chew et al. |
| 2011/0302551 | A1 | 12/2011 | Hummel |
| 2011/0320384 | A1 | 12/2011 | Chang |
| 2012/0022707 | A1 | 1/2012 | Budhraja et al. |
| 2012/0023302 | A1 | 1/2012 | Arndt et al. |
| 2012/0102396 | A1 | 4/2012 | Arksey et al. |
| 2012/0151453 | A1 | 6/2012 | Finking et al. |
| 2012/0226742 | A1 | 9/2012 | Monchilov et al. |
| 2012/0278015 | A1 | 11/2012 | Budhraja et al. |
| 2012/0330869 | A1 | 12/2012 | Durham |
| 2013/0042154 | A1 | 2/2013 | Agarwa et al. |
| 2013/0080197 | A1 | 3/2013 | Kung et al. |
| 2013/0166568 | A1 | 6/2013 | Binkert et al. |
| 2013/0283106 | A1 | 10/2013 | King et al. |
| 2014/0043325 | A1 | 2/2014 | Ruble et al. |
| 2014/0058775 | A1 | 2/2014 | Siig et al. |
| 2014/0249999 | A1 | 9/2014 | Johnson et al. |
| 2015/0081701 | A1 | 3/2015 | Lerios et al. |
| 2015/0106456 | A1 | 4/2015 | van Hoek |
| 2015/0149912 | A1 | 5/2015 | Moore |
| 2015/0178877 | A1 | 6/2015 | Bogomolov et al. |
| 2015/0317344 | A1 | 11/2015 | Birdwell et al. |
| 2015/0324437 | A1 | 11/2015 | Jiang et al. |
| 2015/0378863 | A1 | 12/2015 | Balachandran |
| 2015/0378869 | A1 | 12/2015 | Balachandran |
| 2016/0062737 | A1 | 3/2016 | Stanfill et al. |
| 2016/0070430 | A1 | 3/2016 | Kim et al. |
| 2016/0070451 | A1 | 3/2016 | Kim et al. |
| 2016/0092476 | A1 | 3/2016 | Stojanovic et al. |
| 2016/0364434 | A1 | 12/2016 | Spitz et al. |
| 2017/0005674 | A1 | 1/2017 | Hussain et al. |
| 2017/0032026 | A1 | 2/2017 | Parker et al. |
| 2017/0039500 | A1 | 2/2017 | Leidner et al. |
| 2017/0116396 | A1 | 4/2017 | Gu et al. |
| 2017/0212944 | A1 | 7/2017 | Hellman et al. |
| 2017/0277664 | A1 | 9/2017 | Mihalcea et al. |
| 2017/0286264 | A1 | 10/2017 | Surmarayana |
| 2017/0315516 | A1 | 11/2017 | Kozionov et al. |
| 2017/0373932 | A1 | 12/2017 | Subramanian et al. |
| 2018/0129374 | A1 | 5/2018 | Kim et al. |
| 2018/0129719 | A1 | 5/2018 | Kim et al. |
| 2018/0129720 | A1* | 5/2018 | Kim ............... G06F 16/258 |
| 2018/0157579 | A1 | 6/2018 | Rozenberg et al. |
| 2018/0349251 | A1 | 12/2018 | Mietke et al. |
| 2019/0004929 | A1 | 1/2019 | Fastabend et al. |

OTHER PUBLICATIONS

Bae, J., Understanding Indirect Casual Relationships in Node-Link Graphs, Eurographics Conference on Visualization (Euro Vis) Jun. 2017, vol. 36, No. 3, 12 pgs.
Cole, Office-Action, U.S. Appl. No. 15/726,294, dated Nov. 9, 2018, 40 pgs.
Cole, Notice of Allowance, U.S. Appl. No. 15/726,294, dated May 15, 2019, 14 pgs.
Disclosed Anonymously, IP COM Method to enter data while filter applied, Dec. 6, 2011, (YearL 2011), 7 pgs.
Ishio et al., "A Lightweight Visualization of Interprocedural Data-Flow Paths for Source Code Reading," [Online], 2012, pp. 37-46, retrieved from internet on May 7, 2019, <https://ieeexplore.org/stamp.jsp?tp=&arnumber=6240506> (Year: 2012).
Kabbaj et al., "Towards an Active Help on Detecting Data Flow Errors in Business Process Models," [Online}, 2015, pp. 16-25, [retrieved from internet on Jul. 11, 2020] <https://www.researchgate.net/profile/Mohammed_Isaam_Kabbaj/publication/263966796_Toward_an_active_help_on_detecting_data_flow_errors>(Year:2015), 11 pgs.
Kim, Notice of Allowance, U.S. Appl. No. 15/701,381, dated Nov. 9, 2018, 6 pgs.
Kim, Office Action, U.S. Appl. No. 15/345,391, dated Jun. 28, 2019, 10 pgs.
Kim, Office Action, U.S. Appl. No. 15/345,391, dated Feb. 13, 2020, 16 pgs.
Kim, Final Office Action, U.S. Appl. No. 15/345,391, dated Sep. 17, 2020, 16 pgs.
Kim, Office Action, U.S. Appl. No. 15/345,391, dated Jun. 8, 2021, 14 pgs.
Kim, Pre-Interview First Office Action—U.S. Appl. No. 15/701,392, dated Mar. 9, 2020, 5 pgs.
Kim, Final Office Action—U.S. Appl. No. 15/701,392, dated Sep. 21, 2020, 18 pgs.
Kim, Notice of Allowance, U.S. Appl. No. 15/701,392, dated Apr. 20, 2021, 9 pgs.
Kim, Notice of Allowance, U.S. Appl. No. 15/705,174, dated Sep. 24, 2019, 10 pgs.
Kim, Notice of Allowance, U.S. Appl. No. 16/153,615, dated Jul. 14, 2020, 10 pgs.
Kim, Notice of Allowance, U.S. Appl. No. 16/285,084, dated Apr. 6, 2020, 9 pgs.
Kim, Notice of Allowance, U.S. Appl. No. 16/537,444, dated Jul. 22, 2020, 13 pgs.
Kim, Notice of Allowance, U.S. Appl. No. 16/138,705, dated Aug. 7, 2020, 9 pgs.
Pugh, Notice of Allowance, U.S. Appl. No. 16/155,818, dated Oct. 1, 2020, 9 pgs.
Ghani, S., Perception of Animated Node-Link Diagrams Graphs, Eurographics Conference on Visualization, (Euro Vis) Jun. 2012, vol. 31, No. 3, 11 pgs.

(56) References Cited

OTHER PUBLICATIONS

Logothetis et al., "Scalable Lineage Capture for Debugging DISC Analytics," [Online], 2013, pp. 1-15, retrieved from internet on May 7, 2019, <http://delivery.acm.org/10.1145/250000/252369/a17-logothetis.pdf> (Year:2013).

Lovat et al., "On Quantitative Dynamic Data Flow Tracking," [Online], 2014, pp. 211-222, [retrieved from internet on Jul. 11, 2020, <https://dl,acm/doi/pdf/10.11145/2557547.2557551> (Year: 2014), 12 pgs.

Meda et al., "On Detecting Data Flow Errors in Workflows," [Online] 2010, pp. 4:1-4:31, [retrieved from internet on Jul. 11, 2020], <https://dl.acm.org/doi/pdf/10.1145/1805286.1805290> (Year: 2020), 31 pgs.

Moser et al., "Advanced Verification of Distributed WS-BPEL Business Processes Incorporating CSSA-based Data Flow Analysis," [Online], 2007, pp. 1-8, [retrieved from internet on Jul. 11, 2020], <https://ieeexplore.ieee.org/stamp/stamp.jsp?tp=&arnumber-4278643> (Year: 2007), 8 pgs.

Tableau Software, Inc., International Search Report and Written Opinion, PCT/US2017/060232, dated Jan. 18, 2018, 10 pgs.

Tableau Software, Inc., International Search Report and Written Opinion, PCT/US2019/053935, dated Dec. 18, 2019, 13 pgs.

Tableau Software, Inc., Communication Pursuant Rules 161(1) and 162, EP17801216.7, dated Jun 17, 2019, 3 pgs.

Tableau Software, Inc., Communication Pursuant to Article 94(3), EP17801216.7, dated Apr. 3, 2020, 6 pgs.

Tibco, "TIBCO ActiveMatrix BusinessWorks™ Process Design Software Release 5.13," Aug. 31, 2015, retrieved from the Internet: URL:https://docs.tibco.com/pub/activematrix_businessworks/5.13.0/doc/pdf/tib_bw_process_design_guide.pdf, 107 pgs.

Wildenradt, Notice of Allowance, U.S. Appl. No. 16/681,753, dated May 6, 2021, 10 pgs.

Yip et al., "Improving Application Security with Data Flow Assertions," [Online], 2009, pp. 1-18, retrieved from internet on May 7, 2019, <http://www.sigops.org/conferences/sosp/2009/papers/yip-sosp09.pdf> (Year:2009).

Kim, Final Office Action, U.S. Appl. No. 15/345,391, dated Jan. 6, 2022, 20 pgs.

\* cited by examiner

Figure 5D Inset

Figure 6B

VISUALLY DEFINING MULTI-ROW TABLE CALCULATIONS IN A DATA PREPARATION APPLICATION

CROSS-REFERENCE TO RELATED APPLICATIONS

This application is a continuation of U.S. patent application Ser. No. 16/681,753, filed Nov. 12, 2019, entitled "Visually Defining Multi-Row Table Calculations in a Data Preparation Application," which is incorporated by reference herein in its entirety.

RELATED APPLICATIONS

This application is related to the following applications, each of which is incorporated by reference herein in its entirety: (i) U.S. patent application Ser. No. 15/345,391, filed Nov. 7, 2016, entitled "User Interface to Prepare and Curate Data for Subsequent Analysis"; (ii) U.S. patent application Ser. No. 15/701,381, filed Sep. 11, 2017, entitled "Optimizing Execution of Data Transformation Flows," now U.S. Pat. No. 10,242,079, issued Mar. 26, 2019; (iii) U.S. patent application Ser. No. 14/801,750, filed Jul. 16, 2015, entitled "Systems and Methods for using Multiple Aggregation Levels in a Single Data Visualization"; (iv) U.S. patent application Ser. No. 16/234,470, filed Dec. 27, 2018, entitled "Analyzing Underspecified Natural Language Utterances in a Data Visualization User Interface"; and (v) U.S. patent application Ser. No. 16/601,437, filed Oct. 14, 2019, entitled "Incremental Updates to Natural Language Expressions in a Data Visualization User Interface.

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distributions, trends, outliers, and other factors that are important to making business decisions. Some data sets are very large or complex, and include many data fields. Some data elements must be computed based on data from the selected data set. Various tools can be used to help understand and analyze the data, including dashboards that have multiple data visualizations. However, data frequently needs to be manipulated or massaged to put it into a format that can be easily used by data visualization applications. This includes aggregating the data at multiple levels of detail (LOD). Currently, LOD calculations are code-based and difficult to understand.

SUMMARY

There is a need for improved systems and methods to build table calculations in data preparation. Presently, during preparation of raw data for subsequent visualization and analysis, a user may perform multi-row operations that create or replace an existing column of a data source. To create a new data column, a user must provide a new column calculation, a data field for window/partition, and an optional sort data field. This often requires a user to embark on a complex code-writing process, requiring programming knowledge. Furthermore, users may spend a lot of time debugging the calculations.

The present disclosure describes processes and user interfaces that are used by data preparation ("data prep") applications. These processes and user interfaces provide a direct, interactive, and visual approach to perform multi-row operations and build table calculations. These data prep applications allow a user to select fields in a data source for grouping. The data prep applications perform calculations within each group independently, and provide the user with a view into the statistical distribution. The user can interact with the calculations and identify statistical information on the fly. The data prep applications also include visual indicators that provide the user with visual hints about what the results are, and what outliers there might be, before the user commits to a calculation.

In accordance with some implementations, a method for building table calculations during data preparation executes at a computing device. The computing device includes a display, one or more processors, and memory. The memory stores one or more programs configured for execution by the one or more processors. The method includes displaying a user interface that includes a data pane and a calculation pane. The data pane includes a grid comprising a plurality of data rows and a plurality of data columns. Each of the data columns corresponds to a data field from a data source. Each of the data columns comprises a field name. Each of the data rows comprises a respective data value for each of the data columns. The computing device receives a first user input in the calculation pane to specify a grouping on a first data field of the data source. The computing device receives a second user input in the calculation pane to specify an aggregation function on a second data field of the data source. In response to the first user input and the second user input, for each distinct value of the first data field, the computing device aggregates corresponding values of the second data field according to the aggregation function. The computing device displays in the calculation pane a plurality of first data rows. Each of the first data rows corresponds to a respective distinct value of the first data field and each of the first data rows includes a respective aggregated value that is calculated based on the aggregation function. The computing device saves rows of data displayed in the calculation pane as a new data source.

In some implementations, the saved rows are the first data rows.

In some implementations, the method further comprises receiving a third user input in the calculation pane to specify one or more sub-groupings of the first data field according to a third data field of the data source. In response to the third input, the computing device partitions each distinct value of the first data field into one or more respective subgroups. Each of the subgroups corresponds to a respective distinct value of the third data field. For each distinct pair of values of the first data field and the third data field, the computing device aggregates corresponding values of the second data field according to the aggregation function. The computing device displays in the calculation pane a plurality of second data rows. Each of the second data rows corresponds to a respective distinct pair of values of the first data field and the third data field. The saved rows are the second data rows.

In some instances, the partitioning further comprises sorting the one or more subgroups according to values of the third data field.

In some implementations, the method, further comprises displaying in the calculation pane a plurality of visual distributions. Each of the visual distributions corresponds to a respective first data row of the plurality of first data rows, and a respective visual distribution visually represents an entire domain of second data field values for the corresponding first data row.

In some instances, the visual distribution includes a plurality of visual indicators for a minimum value, a maximum value, a median value, a lower quartile value, and an upper quartile value of the second data field for the respective first data row.

In some instances, the method further comprises receiving user selection of a visual indicator on the visual distribution. The visual indicator corresponds to a first aggregation function that is distinct from the specified aggregation function. In response to the user selection, the computing device displays a respective updated aggregated value in each of the first data rows. The updated aggregated value is calculated based on the first aggregation function.

In some instances, the method further comprises: for each of the visual distributions, displaying a respective count of values, for the second data field, that contribute to the visual distribution.

In some instances, the plurality of visual distributions includes a visual distribution whose count of values is one.

In some instances, the method further comprises displaying within the visual distribution a visual indication of the specified aggregation function.

In some instances, a subset of the visual distributions has a respective length that provides a visual indication of the range of values in the domain.

In some instances, the subset includes a first visual distribution and a second visual distribution. The first visual distribution has a first length. The second visual distribution has a second length that is distinct from the first length.

In some instances, the first visual distribution and the second visual distribution are horizontally displaced with respect to each other.

In some instances, the subset includes a third visual distribution. The method further comprises displaying a segment along the length of the third visual distribution and receiving a user interaction with the segment. In response to the user interaction, the computing device displays a plurality of values of the second data field. In some instances, the plurality of values includes the median value and the lower quartile value, or the median value and the upper quartile value.

In some instances, the segment includes a first portion and a second portion that is contiguous to the first portion. The second portion is visually distinct from the first portion (e.g., the second portion has a different color from the first portion).

In some instances, the first portion and the second portion share a boundary that corresponds to the median value.

In some implementations, the method further comprises displaying a first data column in the data pane. The first data column includes a plurality of first data values. Each of the first data values is a respective aggregated value of the second data field corresponding to the respective value of the first data field in the respective data row.

In some implementations, the method further comprises receiving user selection of a row in the first data rows in the calculation pane. The row corresponds to a first value of the first data field. In response to the user selection, the computing device filters the data rows in the data pane based on the first value. The computing device displays, in the data pane, a subset of the data rows that contain the first value.

In some implementations, the first data field and the aggregation function are displayed as user-selectable options in the calculation pane.

In some implementations, the aggregation function is one of: SUM, AVG, MEDIAN, COUNTD (e.g., count distinct function that returns the number of unique values in the column), MIN, MAX, STDEV, STDEVP (e.g., standard deviation of the population), VAR, and VARP (e.g., variance of the population).

In some implementations, the method further comprises displaying in the calculation pane a histogram of aggregated values that are calculated based on the aggregation function. The histogram includes a plurality of bars. The total cumulative frequency of the histogram is equal to the total number of data rows in the data pane.

In some instances, the histogram includes a plurality of bars. Each of the bars corresponds to a respective distinct range of aggregated values. The method further comprises receiving user selection of a row in the first data rows. The row has a first aggregated value. In response to the user selection, the computing device displays a portion of a first bar corresponding to the first aggregated value in a visually distinctive manner relative to the remaining portion of the first bar.

In some implementations, the method further comprises displaying, in the user interface, a data flow pane. Selection of a node in the data flow pane determines a data set whose data rows are displayed in the data pane.

In some implementations, the method further comprises concurrently displaying in the user interface a plurality of data field panes. Each of the data field panes corresponds to a respective data field from the data source. The computing device displays, in each of the data field panes, a plurality of distinct data values of the data field.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 6A-6C provide a series of screen shots for a graphical user interface according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details

DESCRIPTION OF IMPLEMENTATIONS

Figure 1:
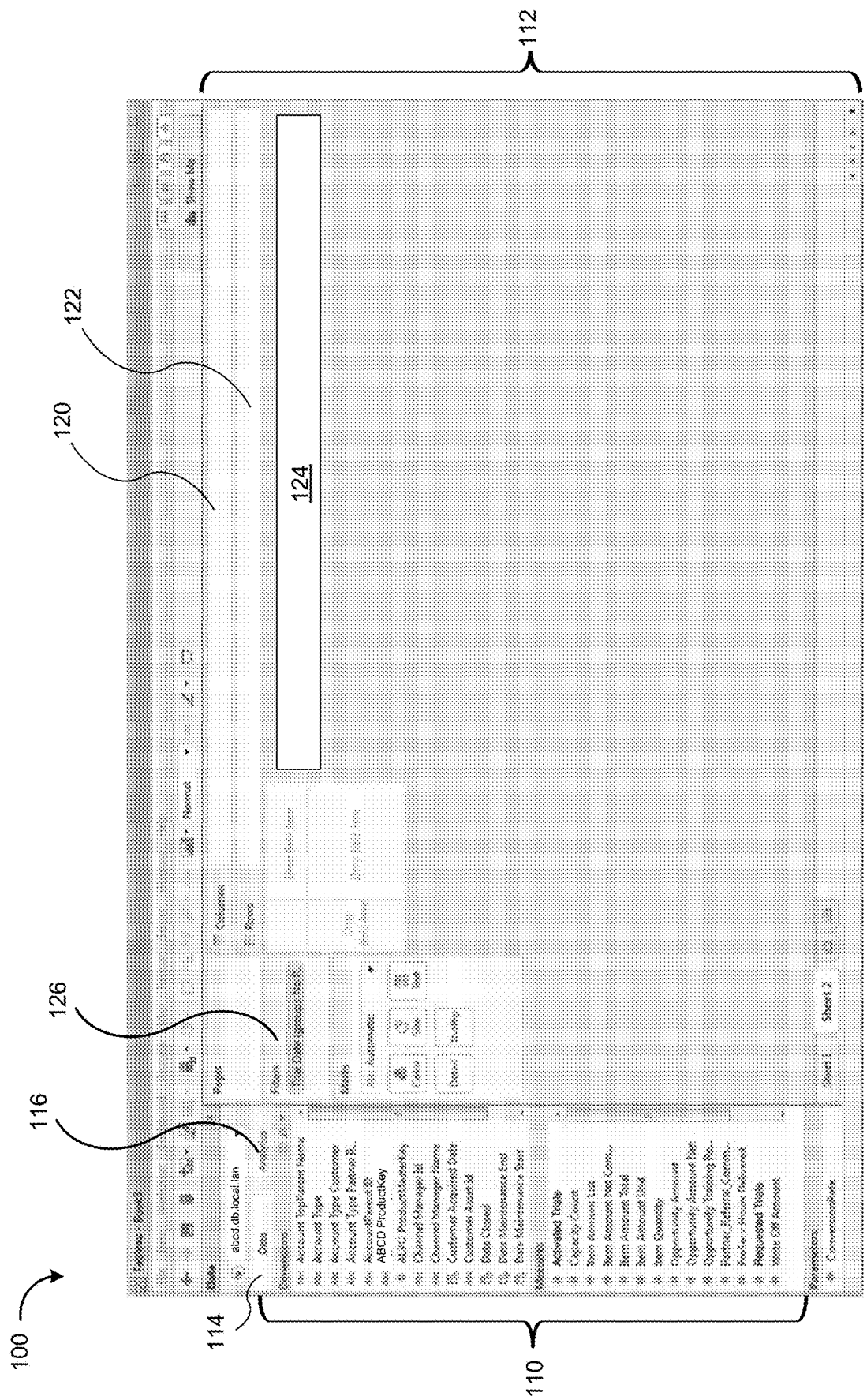
FIG. 1 illustrates a graphical user interface for data visualization according to some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. Details on the use of natural language expressions to generate data visualizations are described in U.S. patent application Ser. No. 16/234,470, filed Dec. 27, 2018, entitled "Analyzing Underspecified Natural Language Utterances in a Data Visualization User Interface," and in U.S. patent application Ser. No. 16/601,437, filed Oct. 14, 2019, entitled "Incremental Updates to Natural Language Expressions in a Data Visualization User Interface," each of which is incorporated by reference herein in its entirety.

In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
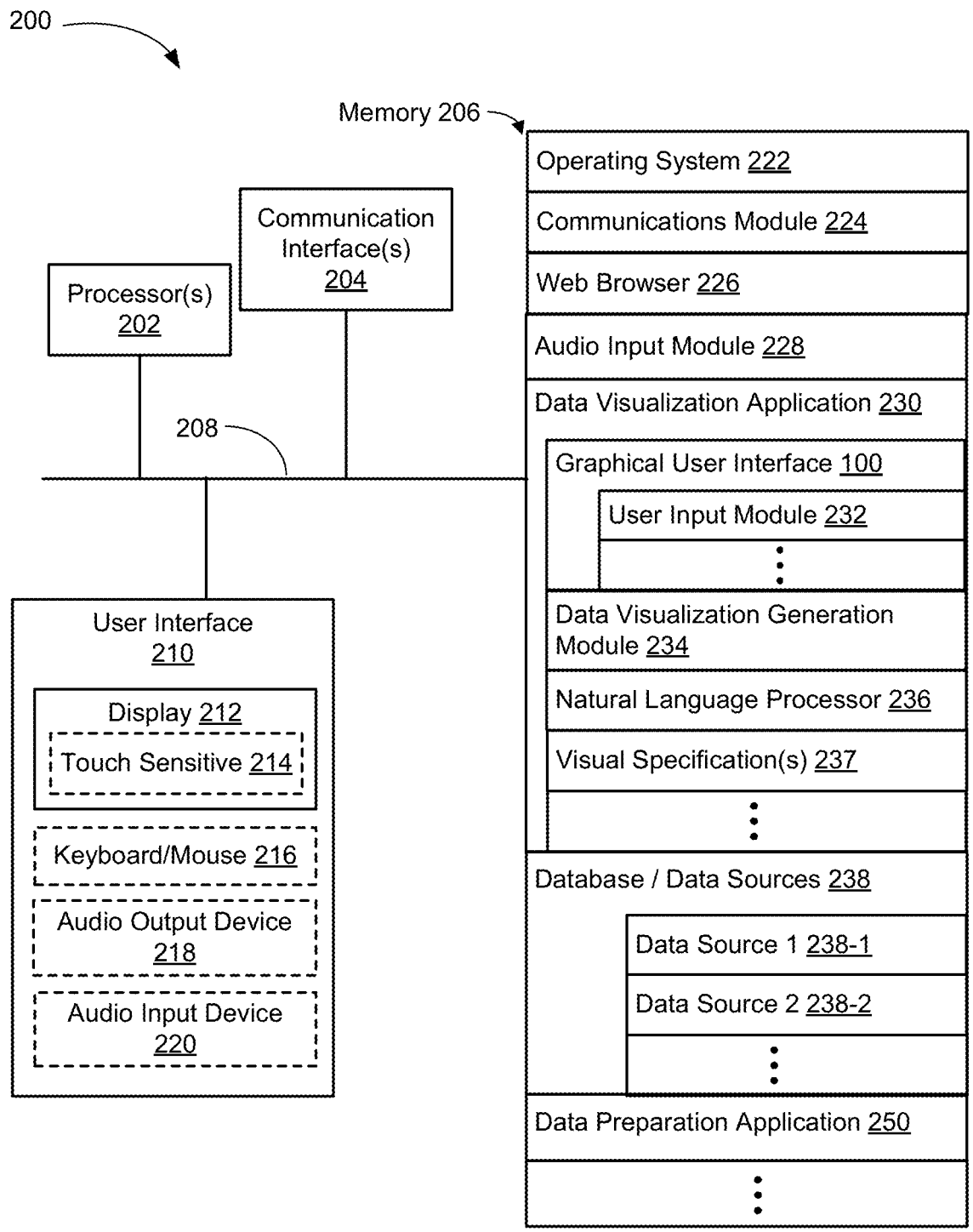
FIGS. 2A and 2B are block diagrams of a computing device according to some implementations.

FIG. 2A is a block diagram illustrating a computing device 200 that can display the graphical user interface 100 in accordance with some implementations. The computing device can also be used by a data preparation ("data prep") application 250. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230, the natural language processing module 236, or the data prep application 250);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 238 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generation module 234, which automatically generates and displays a corresponding visual graphic (also referred to as a "data visualization" or a "data viz") using the user input (e.g., the natural language input);
  - a natural language processing module 236, which receives and parses the natural language input provided by the user. In some instances, the natural language processing module 236 identifies analytical expressions, such as aggregation expressions, group expressions, filter expressions, limit expressions, sort expressions, and table calculation expressions, as described in U.S. patent application Ser. No. 16/234,470, filed Dec. 27, 2018, entitled "Analyzing Underspecified Natural Language Utterances in a Data Visualization User Interface";
  - visual specifications 237, which are used to define characteristics of a desired data visualization. In some implementations, the information the user provides (e.g., user input) is stored as a visual specification. In some implementations, the visual specifications 237 include previous natural language commands received from a user or properties specified by the user through natural language commands. In some instances, a visual specification 237 includes two or more aggregations based on different levels of detail. Further information about levels of detail are provided in U.S. patent application Ser. No. 14/801,750, filed Jul. 16, 2015, entitled "Systems and Methods for using Multiple Aggregation Levels in a Single Data Visualization," which is incorporated by reference herein in its entirety; and
- zero or more databases or data sources 238 (e.g., a first data source 238-1 and a second data source 238-2), which are used by the data visualization application 230. In some implementations, the data sources are stored as spreadsheet files, CSV files, XML files, or flat files, or stored in a relational database.

In some implementations, the computing device 200 includes a data prep application 250, which can be used to analyze and massage data for subsequent analysis (e.g., by a data visualization application 230).

Figure 2B:
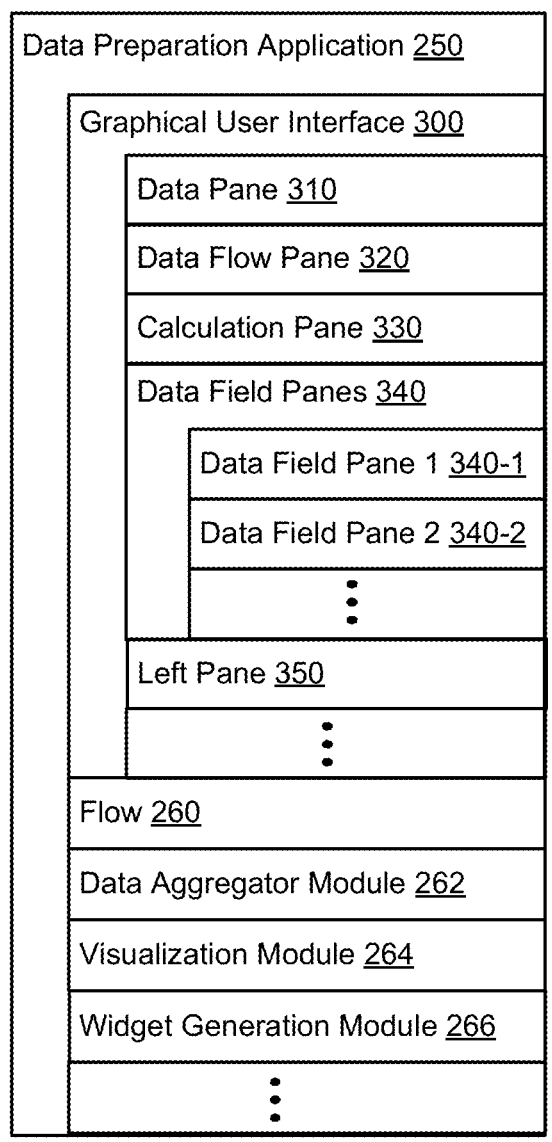

FIG. 2B is a block diagram illustrating a data prep application 250 in accordance with some implementations. In some implementations, the data prep application 250 includes:

- a graphical user interface 300 for preparing data. In some implementations, the graphical user interface 300 includes one or more panes ("windows"), such as:
  - a data pane 310, which displays rows and columns of data (e.g., as a grid) corresponding to selected nodes in the flow diagram, and enables users to modify the flow diagram by interacting with individual data values. Further details of the data pane 310 are described in U.S. patent application Ser. No. 15/345,391, filed Nov. 7, 2016, entitled "User Interface to Prepare and Curate Data for Subsequent Analysis" and described in U.S. patent application Ser. No. 15/701,381, filed Sep. 11, 2017, entitled "Optimizing Execution of Data Transformation Flows," each of which is hereby incorporated by reference herein in its entirety;
  - a data flow pane 320, which displays a visual representation (e.g., node/link flow diagram). The visual representation identifies data sources, operations, and output data sets for a current flow, as described in U.S. patent application Ser. No. 15/345,391 and U.S. patent application Ser. No. 15/701,381. Selection of a node in the data flow pane determines a data set whose data rows are displayed in the data pane 310;
  - a calculation pane 330, which displays data rows of data fields of the data source that have been aggregated during data preparation. In some implementations, the calculation pane 330 also displays the distributions (e.g., statistical distributions) and visual indicators of the aggregated data fields;
  - zero or more data field panes 340 (e.g., a first data field pane 340-1 and a second data field pane 340-2), each of which corresponds to a data field of the data source; and
  - a left pane 350, which includes a list of recent data source connections as well as a button to connect to a new data source, as described in U.S. patent application Ser. No. 15/345,391 and U.S. patent application Ser. No. 15/701,381;

a flow module 260 for building flows;

a data aggregator module 262 for aggregating data fields in the data source during data preparation;

a visualization module 264, which generates visual distributions (e.g., statistical distributions) and visual indicators on aggregated data fields in the data source during data preparation; and a widget generation module 266, which generates widgets that may include user-selectable options. For example, a widget is generated in response to a user selecting a user-selectable affordance, and/or hovering over a visual distribution. In some implementations, the widget includes user-selectable options, such as data fields from the data source, that the user can easily select.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated FIG. 3 illustrates a graphical user interface 300 for data preparation according to some implementations.

In some implementations, the graphical user interface 300 comprises various regions (also referred to as "panes" or "windows"), each with distinct functionality. In the example of FIG. 3, the graphical user interface includes a data pane 310, a data flow pane 320, a calculation pane 330, data field panes 340, and a left pane 350.

The data pane 310 includes a grid comprising data rows 304, data columns 306, and data column 308. Each of the data columns corresponds to a data field of a data source (e.g., data source 238). In the example of FIG. 3, the data source 238 comprises gas prices of target gas stations, which are captured at 15-minute time intervals over a range of dates. As illustrated in FIG. 3, each of the data columns 306 includes a field name. For example, the data column 306-1 has field name "date," the data column 306-2 has field name "Time Recorded," and the data column 306-4 has field name "Price."

Figure 3:
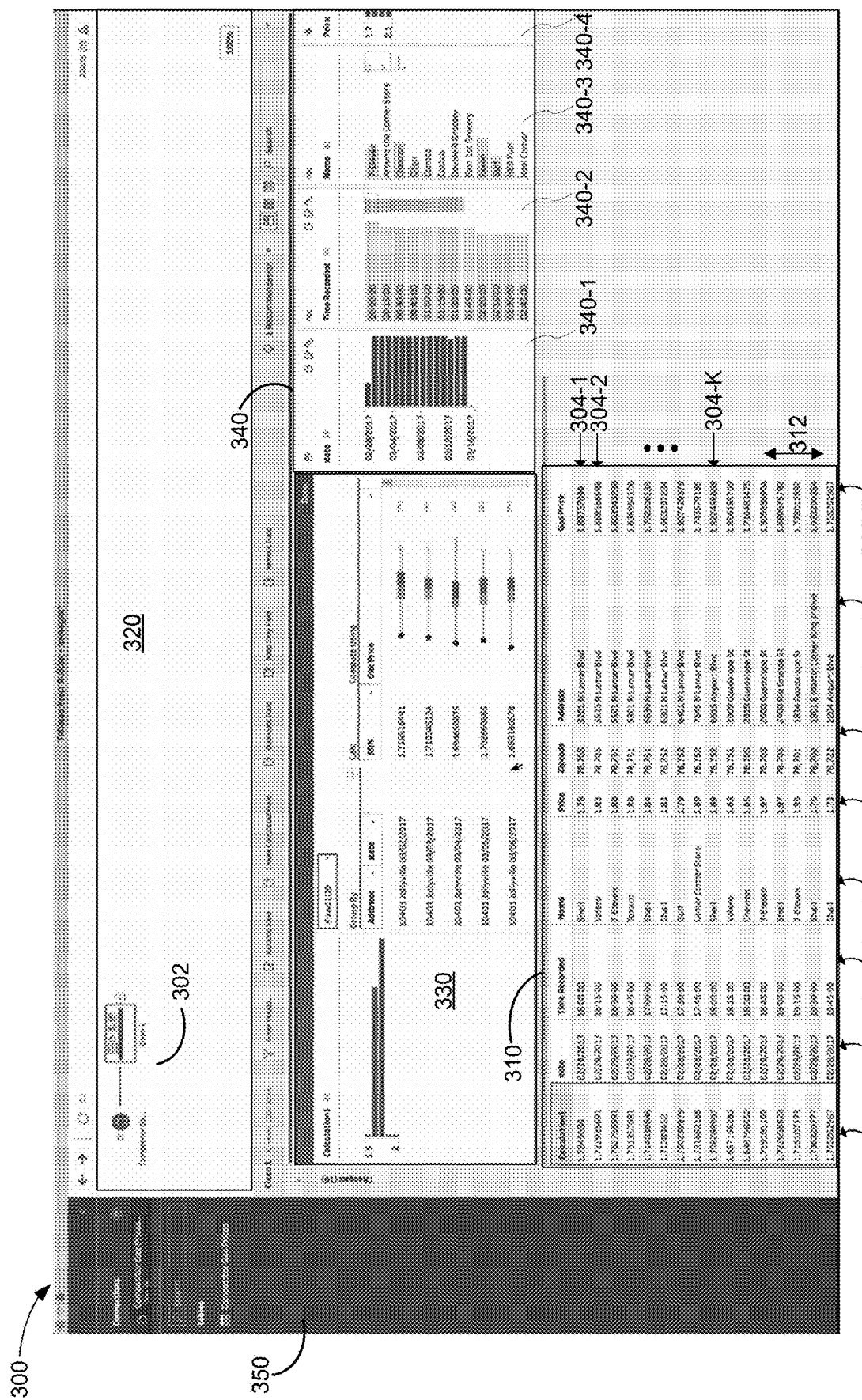
FIG. 3 illustrates a graphical user interface for data preparation according to some implementations.

In the example of FIG. 3, the data fields corresponding to the data columns 306-1 "date," 306-2 "Time Recorded," 306-3 "Name," 306-5 "Zipcode," and 306-6 "Address" are dimensions (e.g., dimensional data fields that comprise categorical data). The data fields corresponding to the data columns 306-4 "Price" and 306-7 "Gas Price" are measures (e.g., numeric quantities). Each of the data rows 304 (e.g., rows 304-1, . . . , 304-K, . . . ) comprises a respective data value for each of the data columns 306.

In some implementations, and as illustrated in FIG. 3, the data grid in the data pane 310 also includes an aggregated data column 308. The aggregated data column 308 contains aggregated data values of one or more data fields in the data source 238. In the example of FIG. 3, each of the data values in the aggregated data column 308 is the minimum gas price corresponding to the address, date, and time of the data row.

In some implementations, and as illustrated in FIG. 3, the graphical user interface 300 includes a data flow pane 320 for building a node/link transformation flow diagram 302. Each node in the flow diagram 302 specifies a respective operation to retrieve data from a respective data source 238, specifies a respective operation to transform data, or specifies a respective operation to create a respective output data set. Selection of a node in the data flow pane 320 determines a data set whose data rows are displayed in the data pane. Further details of the data flow pane 320 are described in U.S. patent application Ser. No. 15/345,391, filed Nov. 7, 2016, entitled "User Interface to Prepare and Curate Data for Subsequent Analysis" and described in U.S. patent application Ser. No. 15/701,381, filed Sep. 11, 2017, entitled "Optimizing Execution of Data Transformation Flows," each of which is hereby incorporated by reference herein in its entirety.

In some implementations, and as illustrated in FIG. 3, the graphical user interface 300 includes a calculation pane 330, which displays rows of data fields of the data source 238 that have been aggregated during data preparation. In some implementations, the calculation pane 330 also displays the distributions (e.g., statistical distributions) and visual indicators of the aggregated data fields. Details of the calculation pane 330 are described in FIGS. 5 and 6.

In some implementations, the graphical user interface 300 includes one or more data field panes 340 (e.g., the panes 340-1, 340-2, 340-3, and 340-4) as illustrated in FIG. 3. Details of the data field panes 340 are described in FIG. 4.

In some implementations, and as illustrated in FIG. 3, the graphical user interface 300 includes a left pane (e.g., "Left-Hand pane") 350. The left pane 350 includes a list of recent data source connections as well as affordance(s) connect to a new data source. Further details of the left pane 350 are described in U.S. patent application Ser. No. 15/345, 391 and U.S. patent application Ser. No. 15/701,381.

In the example of FIG. 3, the data source 238 contains more rows 304 than can be displayed in the field of view of the data pane 310. A user can scroll 312 (e.g., using a scroll affordance on the data pane 310 or by a mouse click or a scroll wheel of a mouse) up or down to access other data rows 304 that are not in the current field of view of the graphical user interface 300.

In some implementations, the panes are arranged in a different layout from that presented in the graphical user interface 300 in FIG. 3. In some implementations, the graphical user interface 300 may include additional panes, and/or omit one or more of the panes that are described in FIG. 3.

Figure 4:
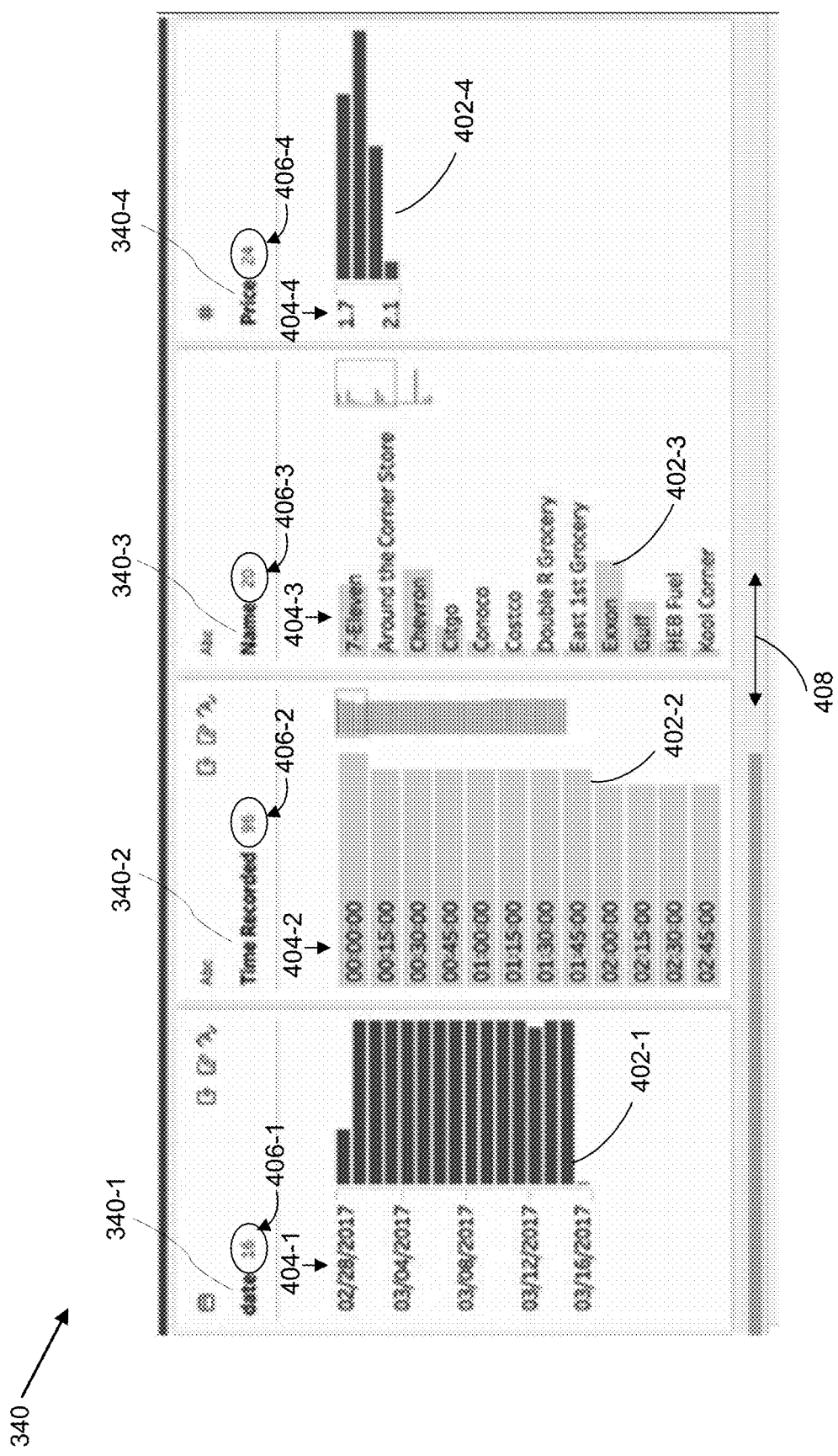
FIG. 4 illustrates data field panes of a graphical user interface according to some implementations.

FIG. 4 illustrates a close up view of the data field panes 340 that is presented in FIG. 3. In FIG. 3, the graphical user interface 300 displays a partial view of the data field panes 340, including a "date" field pane 340-1, a "Time Recorded" field pane 340-2, a "Name" field pane 340-3, and a "Price" field pane 340-4. Each of the data field panes 340 corresponds to a respective data field from the data source 238, and provides insights into the data field to which it corresponds. The data field panes 340 may include data values 404 (e.g., 404-1, 404-2, 404-3, and 404-4) of the data fields, the counts 406 (e.g., 406-1, 406-2, 406-3, and 406-4) of distinct values of the data field, and histograms 402 (e.g., 402-1, 402-2, 402-3, and 402-4), which depict the distribution of the data values 404. A user can scroll 408 left or right to access other data field panes that are not in the present field of view.

FIGS. 5A-5I provide a series of screen shots of the calculation pane 330 according to some implementations.

Figure 5A:
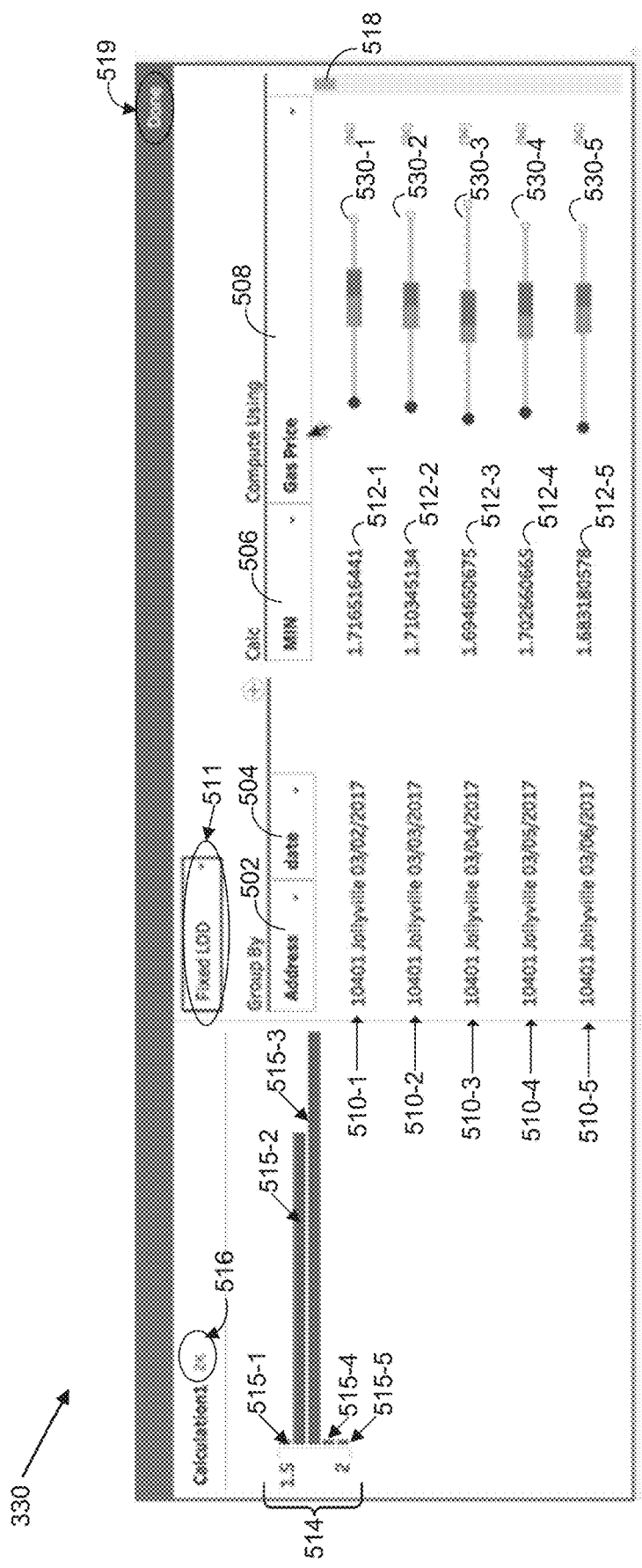
FIGS. 5A-5I provide a series of screen shots for a graphical user interface according to some implementations.

In some implementations, and as illustrated in FIG. 5A, the calculation pane 330 includes a user-selectable affordance 502 that allows a user to specify a grouping on a data field of the data source 238. In this example, the user specifies a grouping of the data source 238 by the field "Address."

Figure 5B:
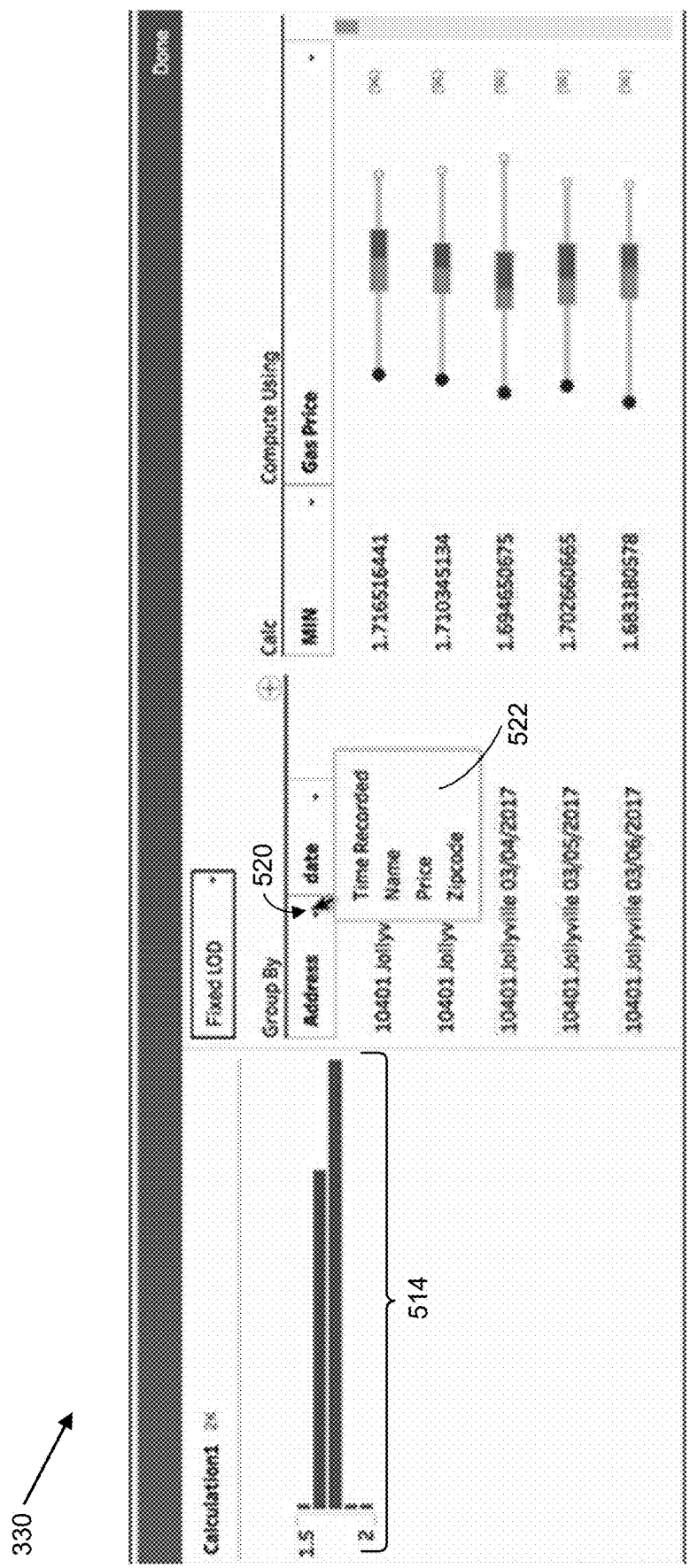

In some implementations, and as illustrated in FIG. 5B, the user may interact with the affordance 502 by selecting a drop-down icon 520, which in turn displays a menu 522 containing a list of other possible candidates (e.g., "Time Recorded," "Name," "Price," and "Zipcode"), which the user may select for the grouping field.

Referring back to FIG. 5A, the calculation pane 330 also includes a user-selectable affordance 506 that allows the user to specify an aggregation function on a data field of the data source, and includes a user-selectable affordance 508 to specify the data field for the aggregation. In this example, the user specifies aggregation of the data field "gas price" using "MIN" (e.g., minimum) as the aggregation function.

Figure 5C:
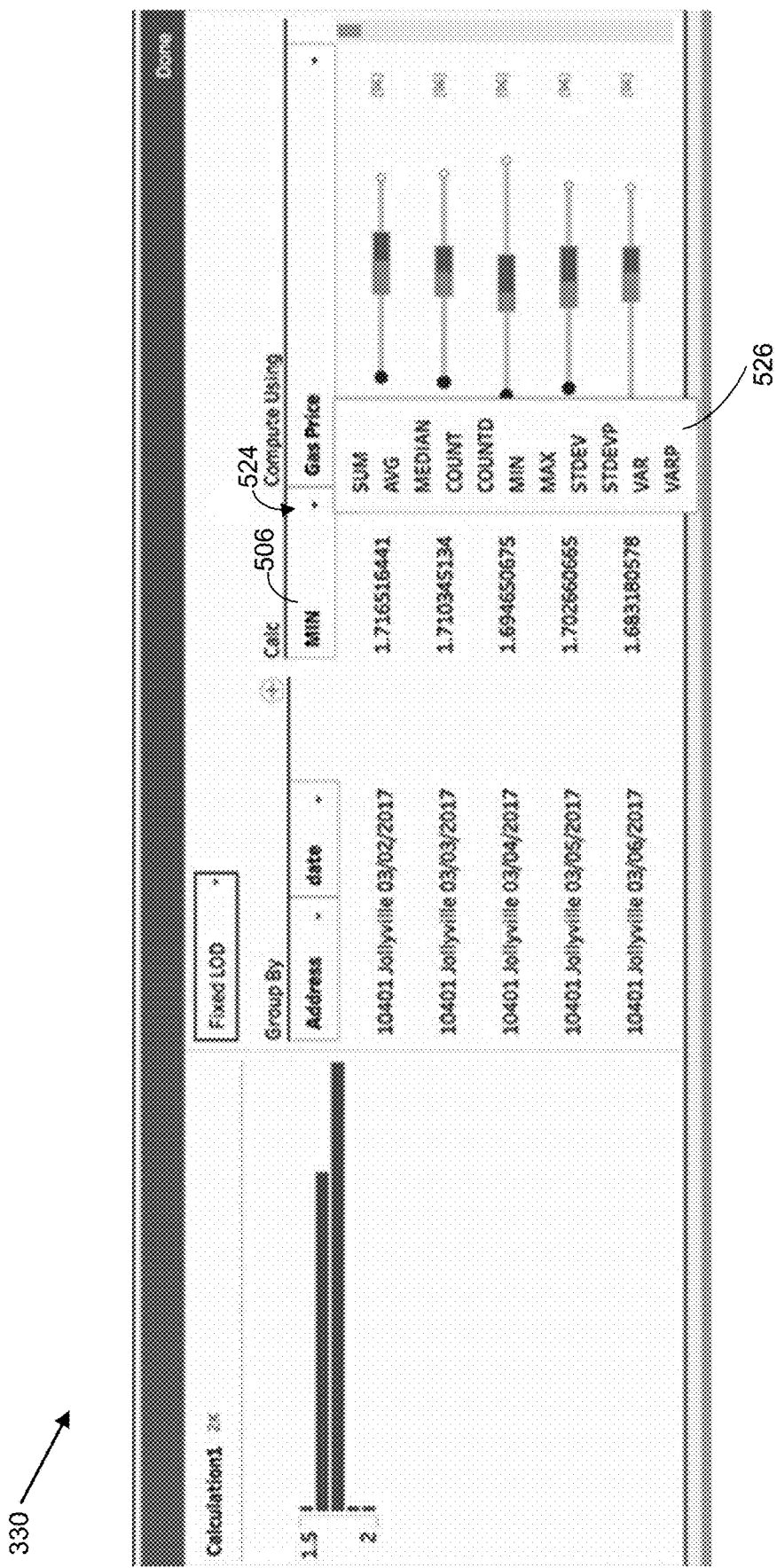

In some implementations, and as illustrated in FIG. 5C, the user may interact with the affordance 506, such as by selecting a drop-down icon 524. User selection of the icon 524 causes display of a menu 526 comprising a list of possible aggregation functions, including "SUM," "AVG," "MEDIAN," "COUNTD" (e.g., a count distinct function that returns the number of unique values), "MIN," MAX," "STDEV," "STDEVP" (e.g., standard deviation of the population), "VAR," and "VARP" (e.g., variance of the population).

Referring again to FIG. 5A, in some implementations, the calculation pane 330 also includes a user-selectable affordance 504, which allows the user to specify a sub-grouping of the grouping field according to another data field of the data source 238. In this example, the user specifies "Date" as the sub-grouping field of the grouping field "Address." In response to user selection of the grouping field "Address," the aggregation function "MIN," and the sub-grouping field "Date," the data prep application 250 groups the data source 238 according to values of the data fields "Address" and "date." The data prep application 250 partitions the rows of the data source into subgroups having the same "Address" and "date" data value. For each of the subgroups, the data prep application 250 aggregates gas prices, and computes the minimum gas price for that subgroup. As illustrated in FIG. 5A, the calculation pane 330 displays data rows 510 (e.g., rows 510-1, . . . , 510-5). Each of the data rows 510 corresponds to a distinct (address, date) pair. Each of the data rows 510 includes a respective aggregated value 512 (e.g., 512-1, . . . , 512-5, representing the minimum gas price for the subgroup), which is calculated based on the aggregation function "MIN."

In some implementations, and as illustrated in FIG. 5A, the data rows 510 are sorted (e.g., arranged) by the Address and date data fields.

In some implementations, and as illustrated in FIG. 5A, the calculation pane 330 also displays a histogram 514 of aggregated values that are calculated based on the aggregation function. In the example of FIG. 5A, the histogram 514 shows the overall distribution of the computed minimum gas prices. The histogram 514 includes histogram bars 515 (e.g., 515-1, . . . , 515-5), which represent the frequency distribution of the minimum gas prices. The histogram 514 represents the total number of computed aggregates. The total number 516 (e.g., 2000) is displayed in the header. The histogram bins the computed minimum values into five ranges, as illustrated by the bars. In this example, the bins are five intervals from 1.5 to 2 (e.g., a first bin for the interval 1.5 to 1.6, a second bin for the interval 1.6 to 1.7, a third bin from 1.7 to 1.8, and so on). Most of the aggregates are in the second and third bins.

In this example, the user has selected a Fixed LOD 511. As explained in U.S. patent application Ser. No. 14/801,750, some implementations support LOD calculations that are identified using the keywords FIXED, INCLUDE, or EXCLUDE.

In some implementations, the calculation pane 330 includes an affordance 519 (e.g., "Done"). When selected, this affordance enables the user to save rows of data (e.g., the data rows 510) displayed in the calculation pane 330 as a new data source.

In some implementations, and as illustrated in FIG. 5A, each of the subgroups 510 includes a respective visual distribution 530 (e.g., distributions 530-1, . . . , 530-5), which visually represents the entire domain of data values used in the aggregation calculation for the subgroup. In this example, each distribution represents the distribution of gas prices from the data source corresponding to the subgroup. FIGS. 5D to 5I illustrate the visual distributions 530 in greater detail.

Figure 5D:
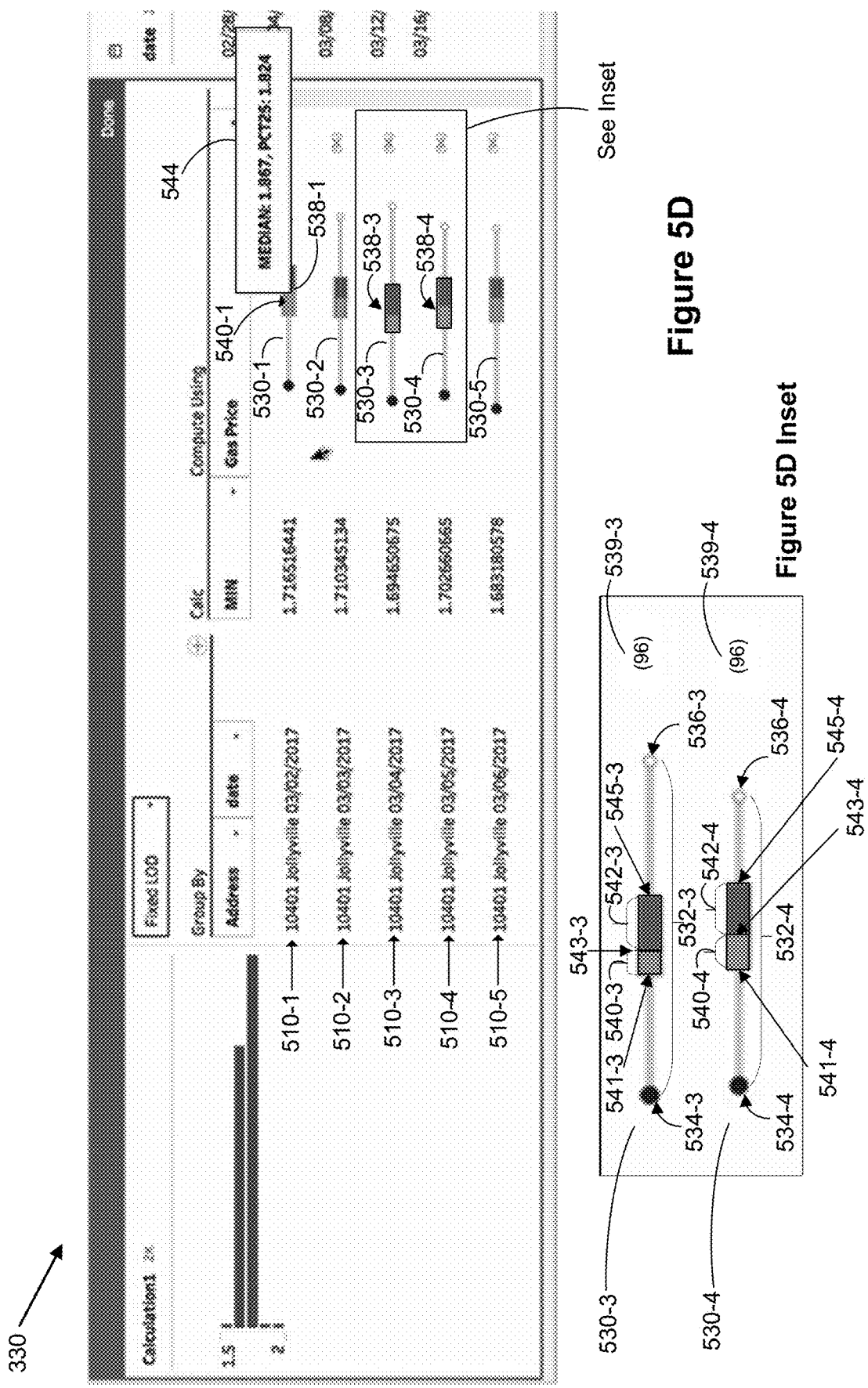

The FIG. 5D inset illustrates a close-up view of the visual distribution 530-3 corresponding to the aggregation subgroup 510-3 and of the visual distribution 530-4 corresponding to the aggregation subgroup 510-4, according to some implementations. Elements described with respect to the visual distribution 530-3 and the visual distribution 530-4 also apply to other visual distributions 530 in the calculation pane 330.

In some implementations, the visual distribution 530 has a respective length 532 that provides a visual indication of a range of values in the domain (e.g., the domain "gas prices" within the subgroup). In the example of FIG. 5D, the visual distribution 530-3 has a length 532-3 that is longer than the length 532-4 of the visual distribution 530-4. Thus, the gas prices for the aggregation group 510-3 span a larger range of values than the gas prices for the aggregation group 510-4.

In some implementations, and as illustrated in FIG. 5D, the visual distribution 530 includes a visual indicator 534 (e.g., a circle) for the minimum value in the range. The visual distribution 530 also includes a visual indicator 536 (e.g., a circle) for the maximum value in the range. In the example of FIG. 5, the visual distribution 530-3 and the visual distribution 530-4 are horizontally displaced with respect to each other. This indicates that the aggregation group 510-3 has a different minimum gas price and a different maximum gas price, from those of the aggregation group 510-4.

In some implementations, the visual distribution 530 also displays a visual indication of the user-specified aggregation function. In this example, the user-specified aggregation function is "minimum." The circles 534 that correspond to the minimum values are closed circles, and are visually distinct from the "open" circle 536 that corresponds to the maximum value. The closed circles indicate that "MIN" is the selected aggregation function.

In some implementations, and as illustrated in FIG. 5D, the calculation pane 330 also displays a segment 538 (e.g., the segments 538-1, 538-3, and 538-4) along the length 532 of each visual distribution 530. Each segment 538 provides an indication of the lower quartile (e.g., 25th percentile), the median, and the upper quartile (e.g., 75th percentile) of the domain.

In some implementations, and as illustrated in the FIG. 5D inset, each segment 538 includes a first portion 540, which identifies the lower quartile 541 (e.g., 25th percentile) of the domain. Each segment 538 also includes a second portion 542, which identifies the upper quartile 545 (e.g., 75th percentile) of the domain. The first portion 540 is visually distinct (e.g., has a different color) from the second portion 542. The first portion 540 and the second portion 542 are contiguous to each other, and share a common boundary 543 that corresponds to the median value of the domain.

In some implementations, and as illustrated in the FIG. 5D inset, the visual distribution 530 includes a count 539 of the number of rows from the data source in the aggregation group. For example, the aggregation group 510-3 corresponding to the address "10401 Jollyville" and the date "Mar. 4, 2017" has 96 rows (539-3) of data (gas prices), which contribute to the range indicated by the visual distribution 530-3.

FIG. 5D illustrates a user interaction with (e.g., hovering over) the first portion 540-1 of the first segment 538-1 corresponding to the visual distribution 530-1. In response to the user interaction, the data prep application 250 generates (e.g., using the widget generation module 266) and displays a widget 544 in the calculations pane 330. The widget includes a median gas price ("MEDIAN: 1.867") and a lower quartile (e.g., 25th percentile) gas price ("PCT25: 1.824") corresponding to the aggregation group 510-1.

Figure 5E:
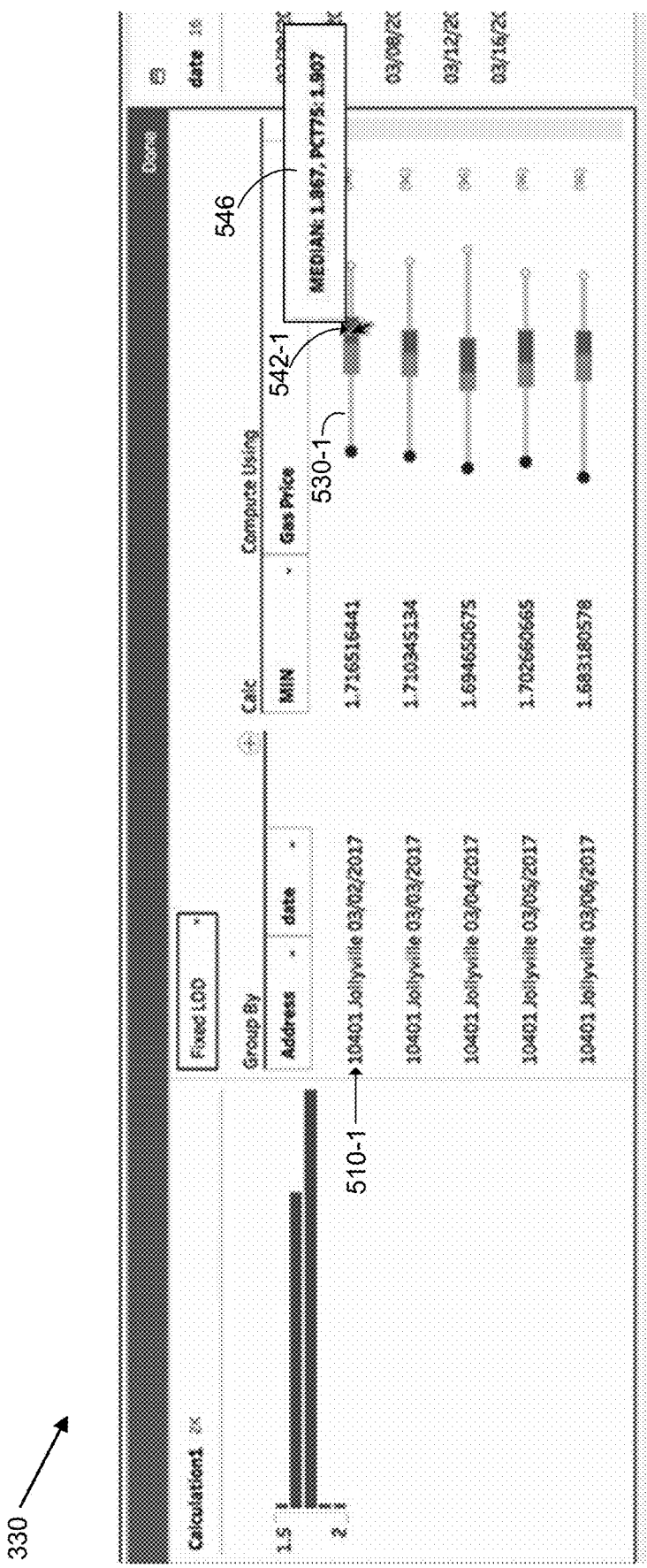

FIG. 5E illustrates a user interaction with the second portion 542-1 of the segment 538-1 of the visual distribution 530-1. In response to the user interaction, the data prep application 250 generates and displays a widget 546 that includes the median gas price ("MEDIAN: 1.867") and an upper quartile (e.g., 75th percentile) gas price ("PCT75: 1.907") corresponding to the aggregation group 510-1.

Figure 5F:
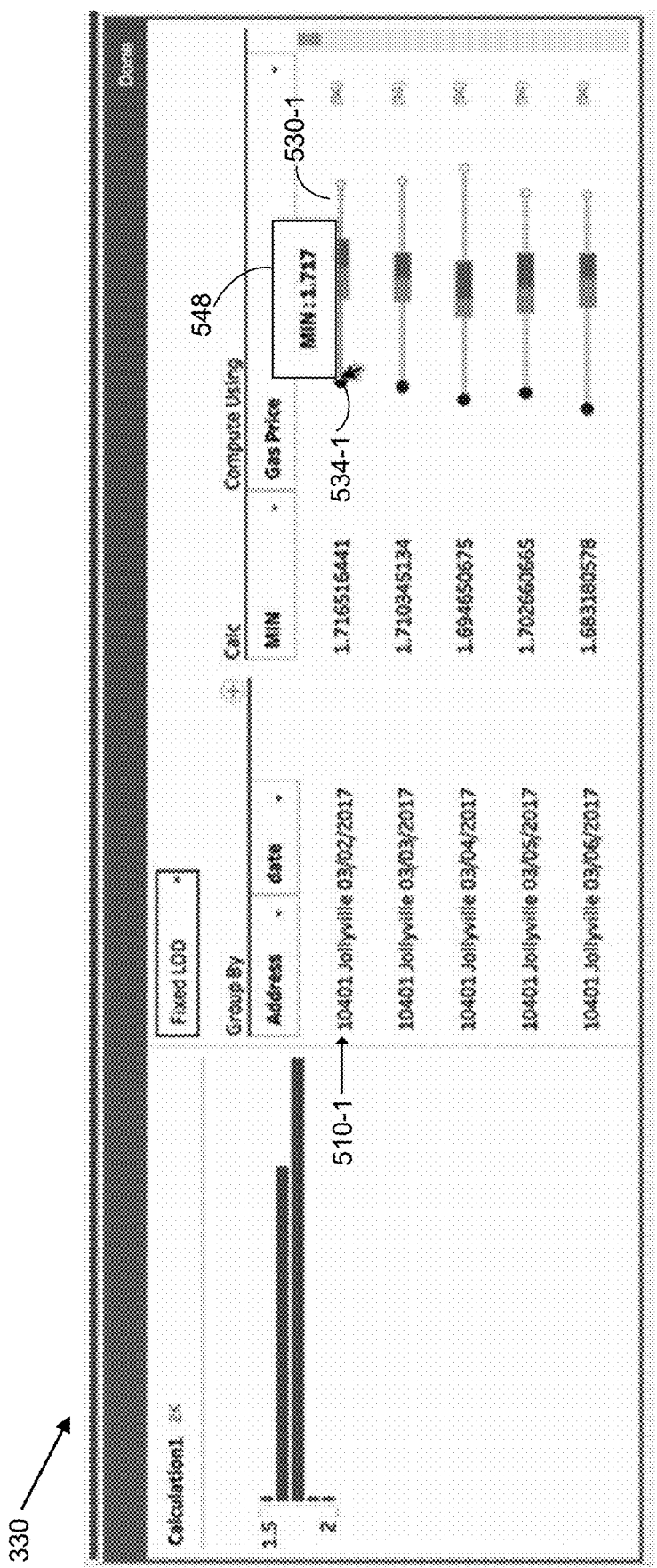

FIG. 5F illustrates a user interaction with the visual indicator 534-1 of the visual distribution 530-1. In response to the user interaction, the calculation pane 330 displays a widget 548 that shows the minimum value ("MIN: 1.717") of the gas price for the aggregation group 510-1.

Figure 5G:
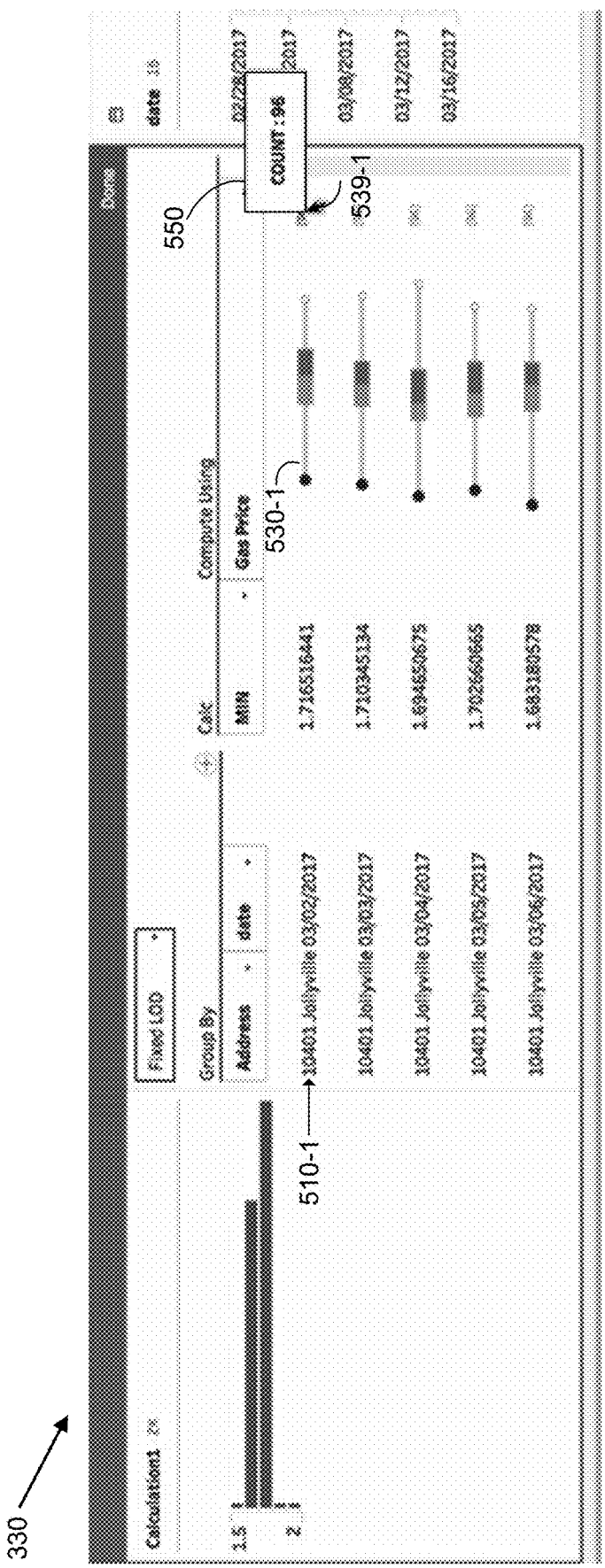

FIG. 5G illustrates a user interaction with the count 539-1 of the visual distribution 530-1. In response to the user interaction, the calculation pane 330 displays a widget 550, which shows the number of rows ("COUNT: 96") in the first aggregation group 510-1.

Figure 5H:
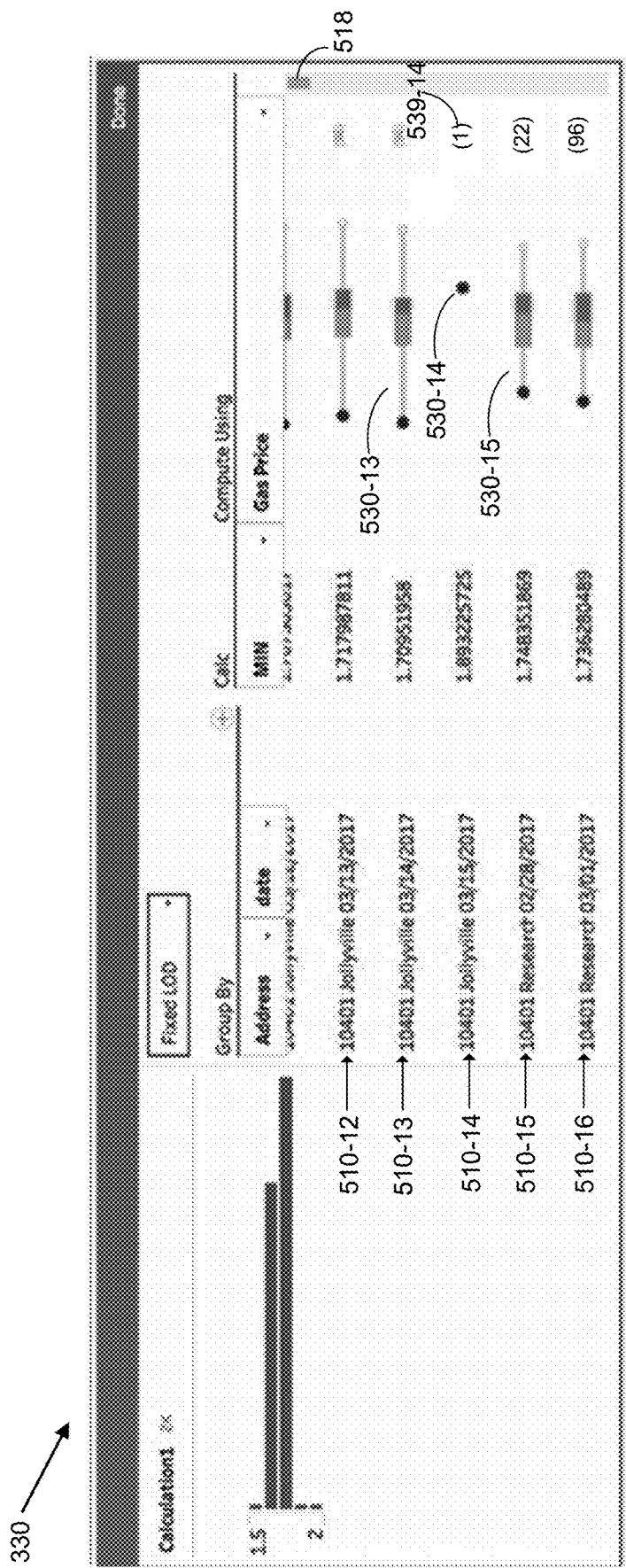

FIG. 5H illustrates a user interaction with the scroll bar 518 of the calculation pane 330. In this example, one of the data rows 510-14 has a visual distribution 530-14 whose count 539-14 is one. The visual distribution 530-14 contains a single point.

Figure 5I:
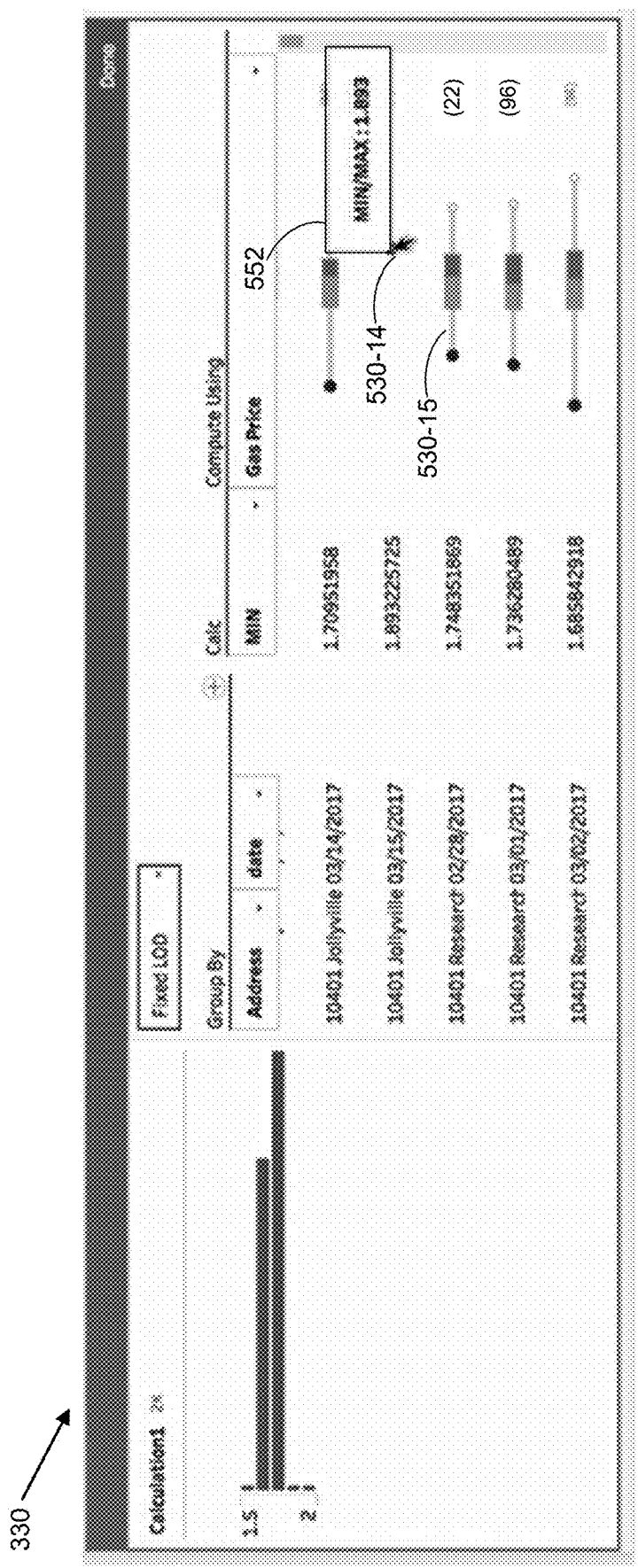

FIG. 5I illustrates a user interaction with the visual distribution 530-14. In response to the user interaction, the calculation pane 330 displays a widget 552 that indicates a single gas price value "MIN/MAX: 1.893."

Figure 6A:
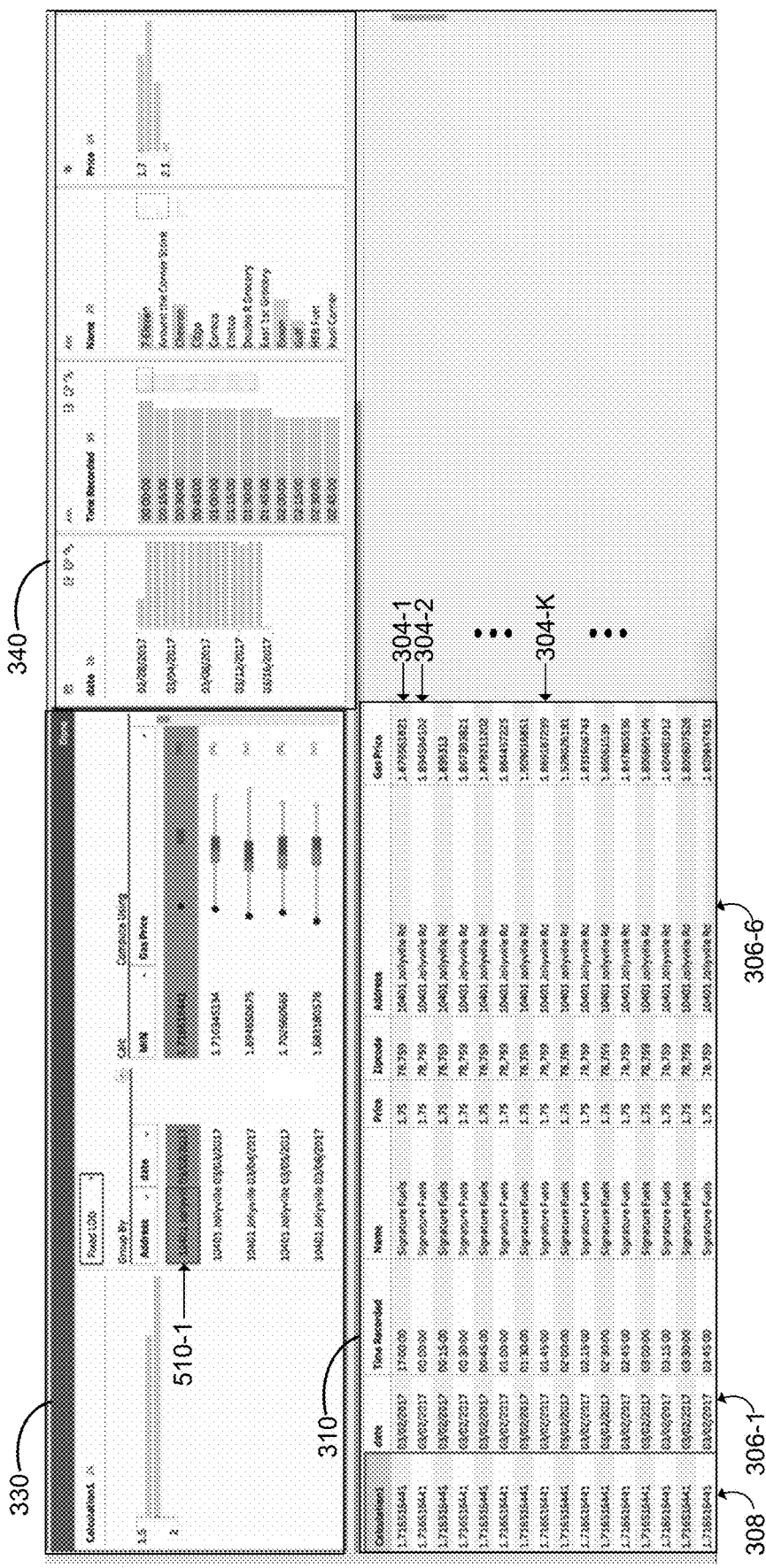
Figure 6B:
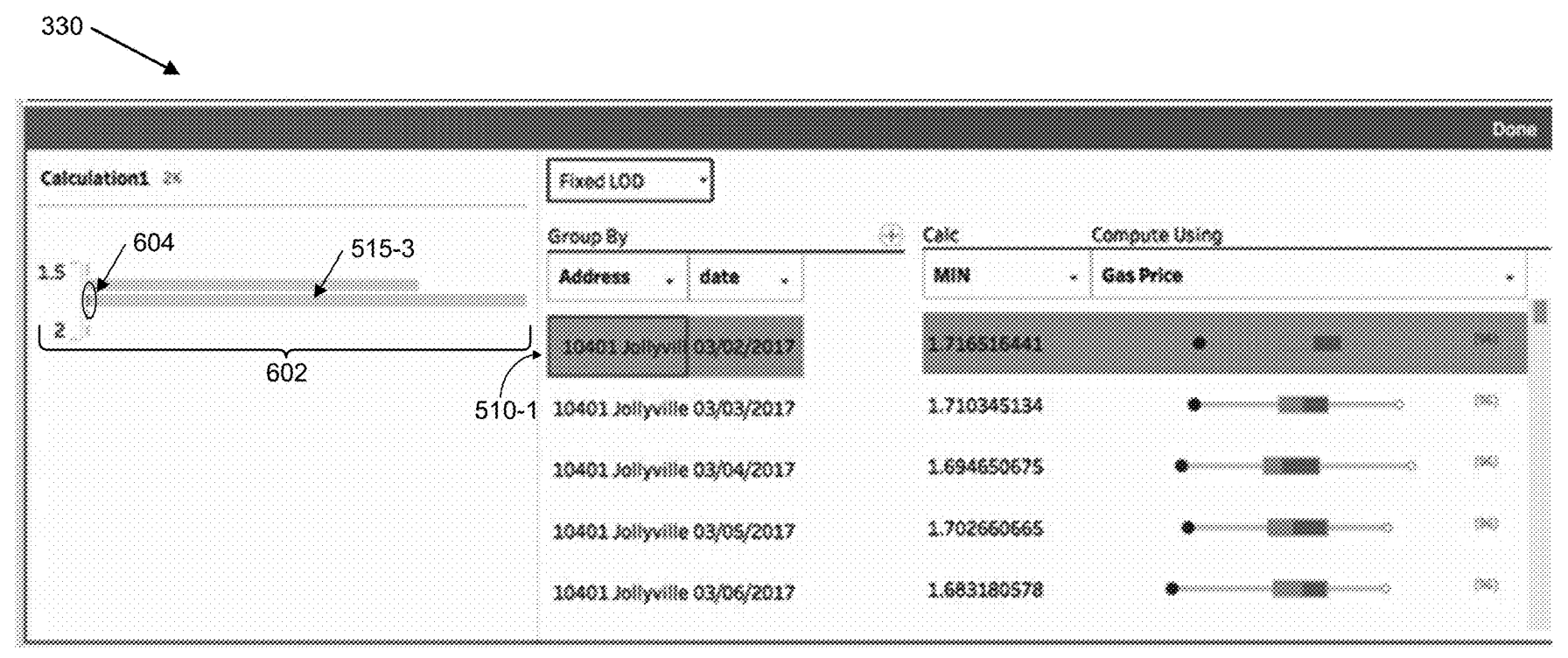
Figure 6C:
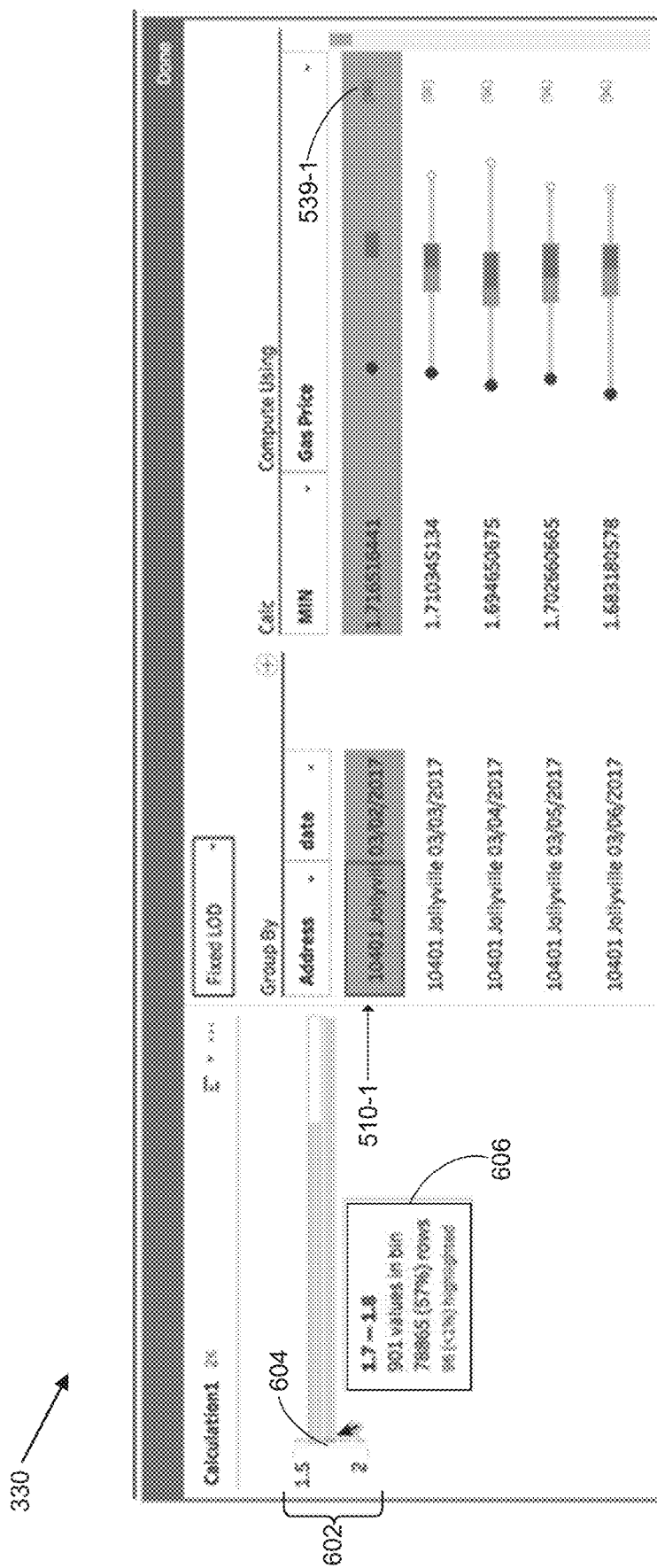

FIGS. 6A-6C provide a series of screen shots for a graphical user interface according to some implementations.

FIG. 6A illustrates a user interaction with (e.g., user selection of) the aggregation group 510-1 in the calculation pane. In response to the user interaction, the data rows 304 in the data pane 310 are filtered according to the values of the grouping field (e.g., "Address") and the sub-grouping field (e.g., "date") of the selected aggregation group 510-1. As illustrated in FIG. 6A, the aggregation group 510-1 has address "10401 Jollyville Rd" and date "Mar. 2, 2017." In response to the user selection of this aggregation group, the data pane 310 displays data rows 304 that have the address "10401 Jollyville Rd" and the date "Mar. 2, 2017."

In some implementations, and as illustrated in FIG. 6A, user selection of an aggregation group in the calculations pane 330 causes the data fields pane 340 to be visually de-emphasized.

FIG. 6B illustrates an updated histogram 602 that is generated and displayed in the calculations pane 330 in response to user selection of the aggregation group 510-1. A comparison between the updated histogram 602 in FIG. 6B and the histogram 514 in FIG. 5A shows that the histogram bars 515-1, 515-2, and 515-4 are visually de-emphasized in FIG. 6B. A portion 604 of the histogram bar 515-3 is visually emphasized (e.g., highlighted). The portion 604 identifies the contribution of the aggregation group 510-1 to the histogram 602. In some implementations (as shown here), the updated histogram is a stacked bar chart.

FIG. 6C illustrates a user interaction with (e.g., hovering over) the visually emphasized portion 604 of the histogram 602. In response to the user interaction, the data prep application 250 generates and displays a widget 606 in the calculations pane 330. The widget 606 displays the range of gas prices ("1.7-1.8") corresponding to the histogram bar. The widget 606 also displays a total count "901 values" of the data source 238 that contribute to the bin (e.g., gas price range of $1.7 to $1.8), and the counts 539-1 "96" and percentage contribution ("<1%") of the aggregation group 510-1 to the bin.

Figure 7A:
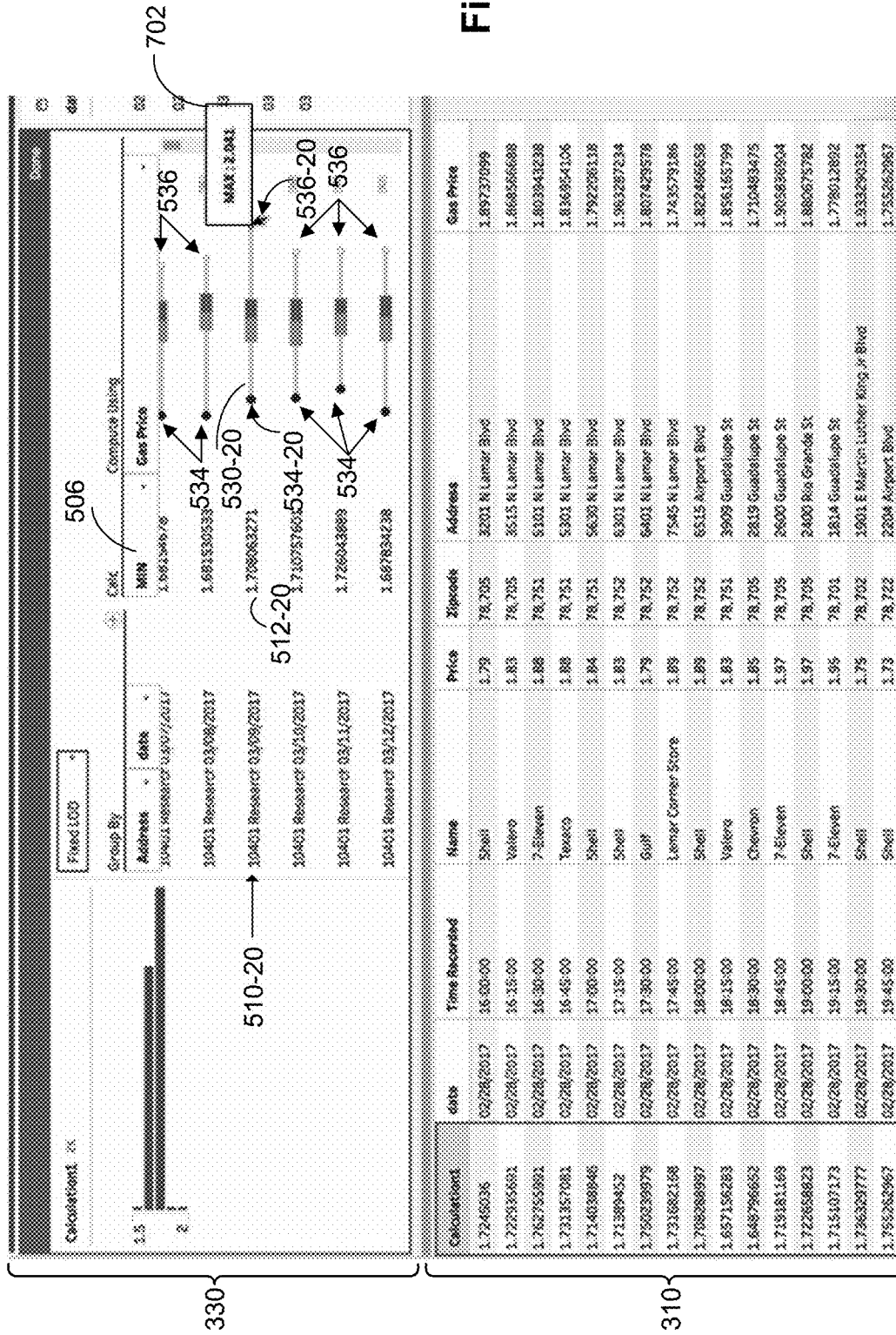
FIGS. 7A and 7B provide a series of screen shots for a graphical user interface according to some implementations.
Figure 7B:
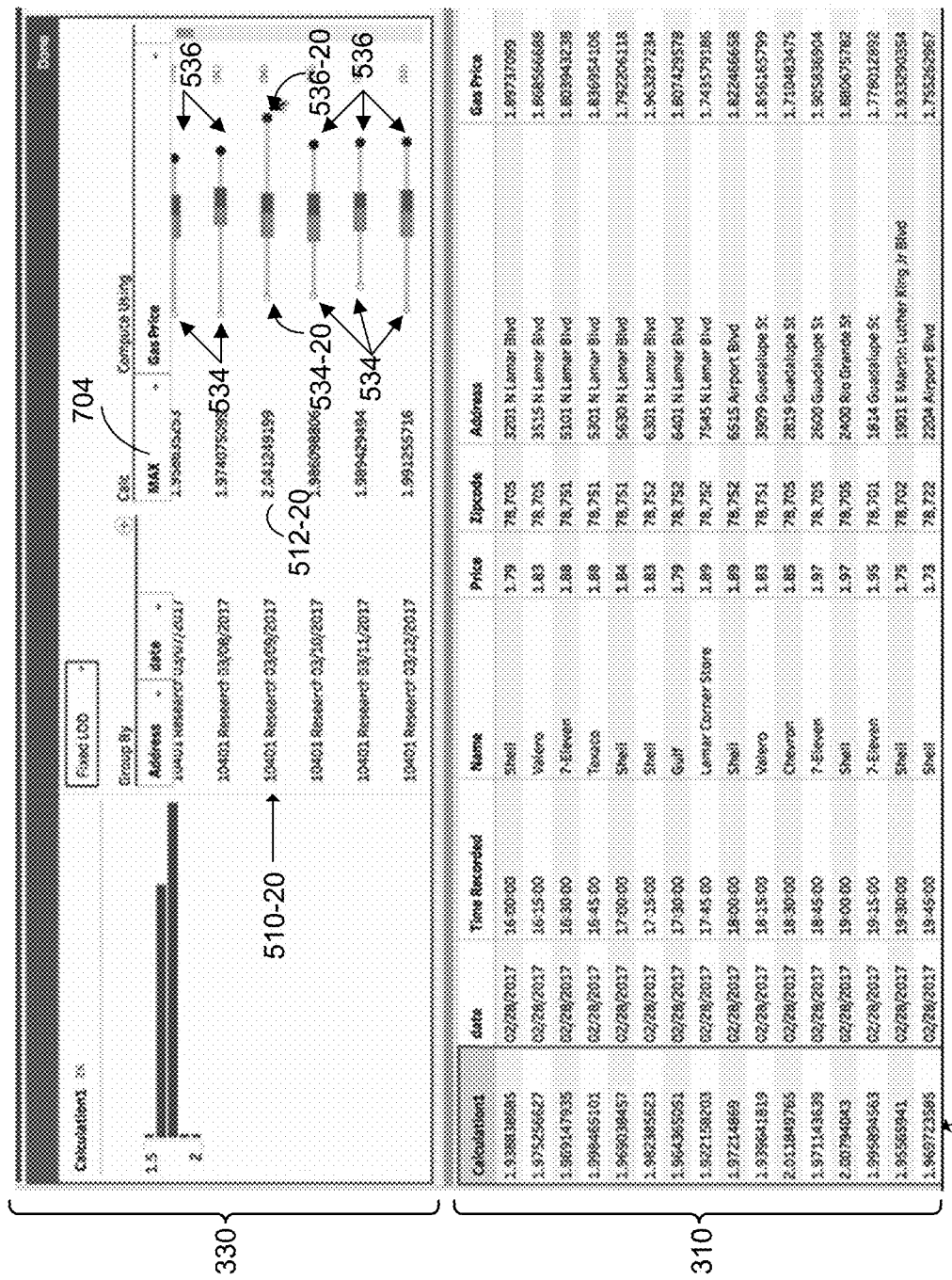
Figure 8A:
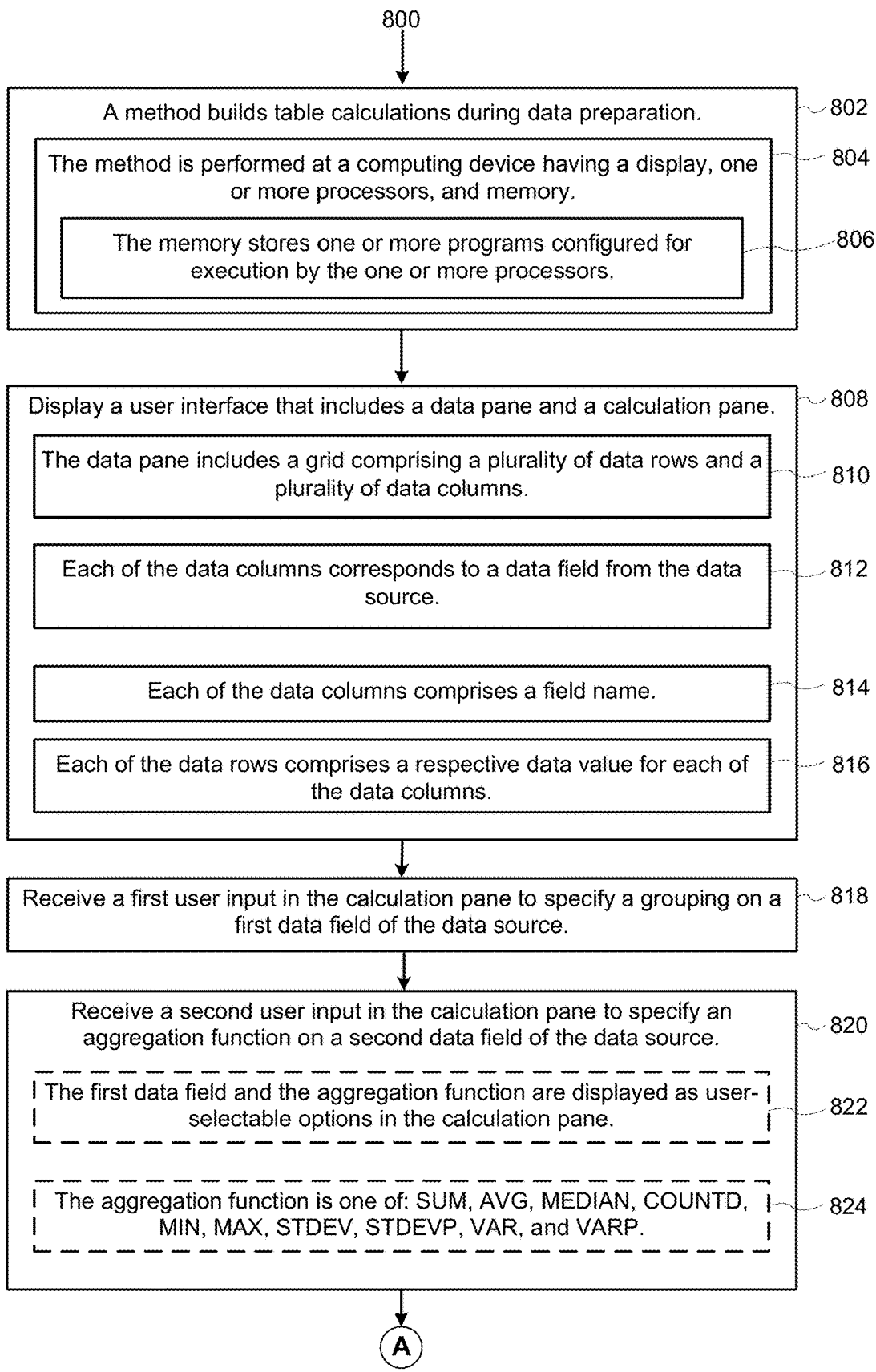
FIGS. 8A-8G provide a flowchart of a method 800 for building table calculations during data preparation according to some implementations.
Figure 8B:
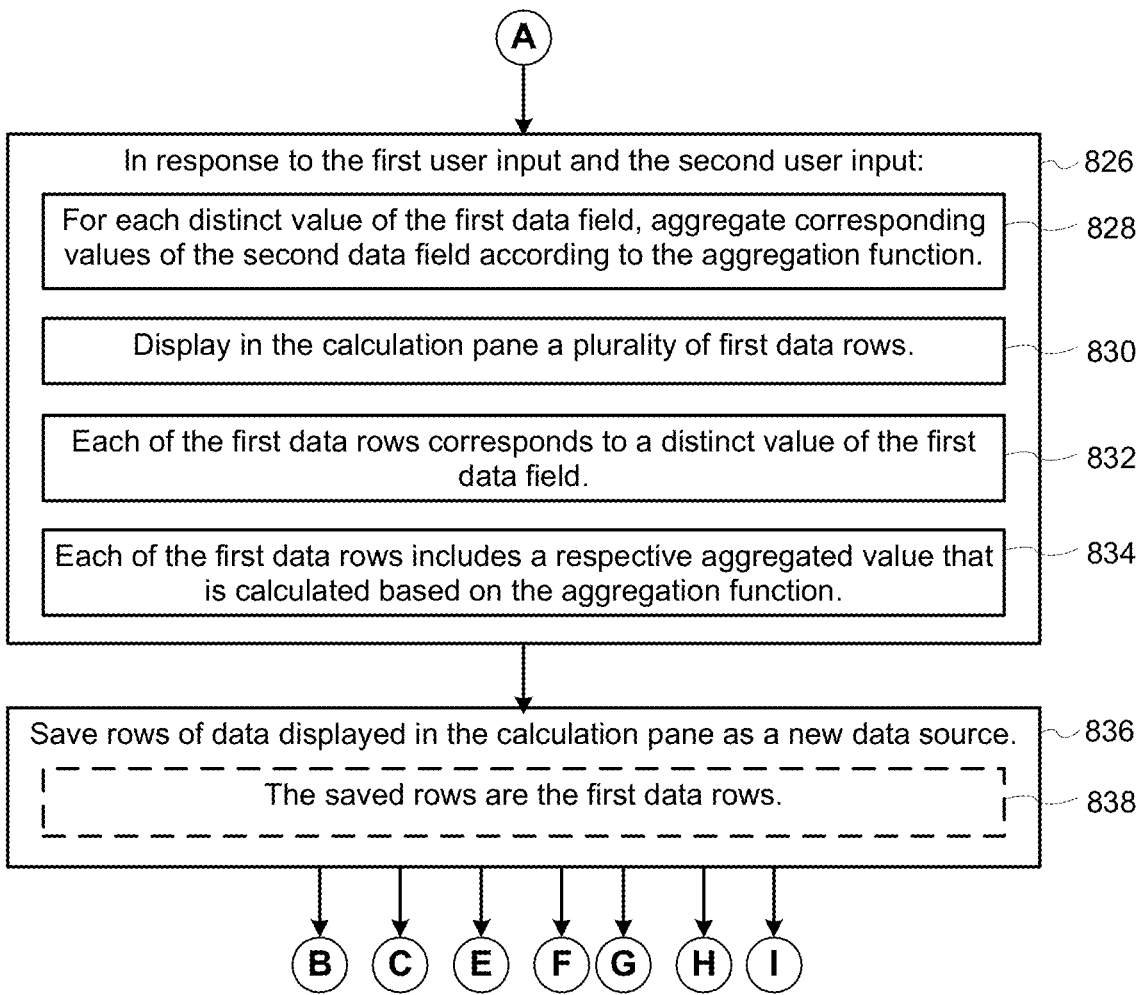
Figure 8C:
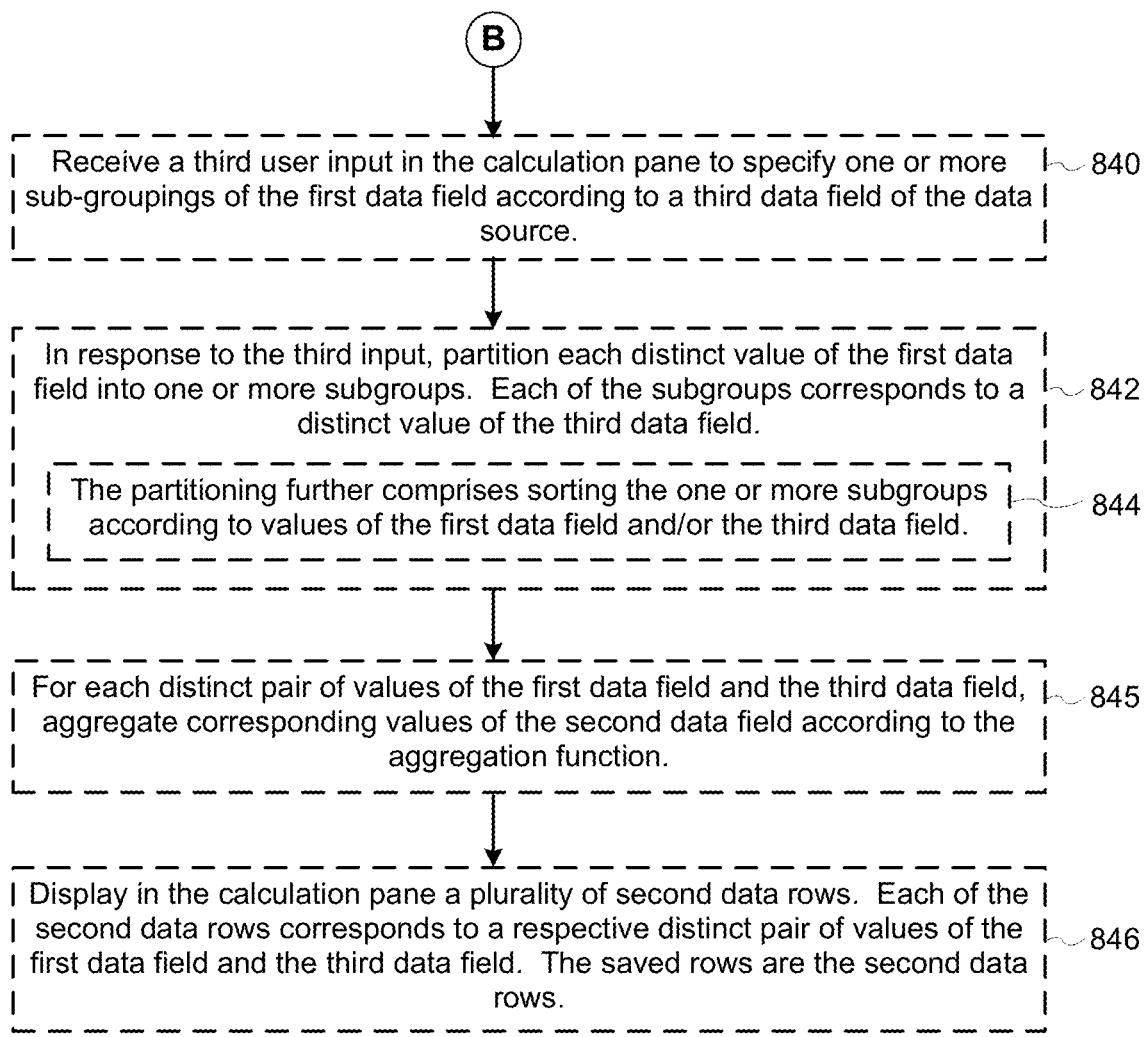
Figure 8D:
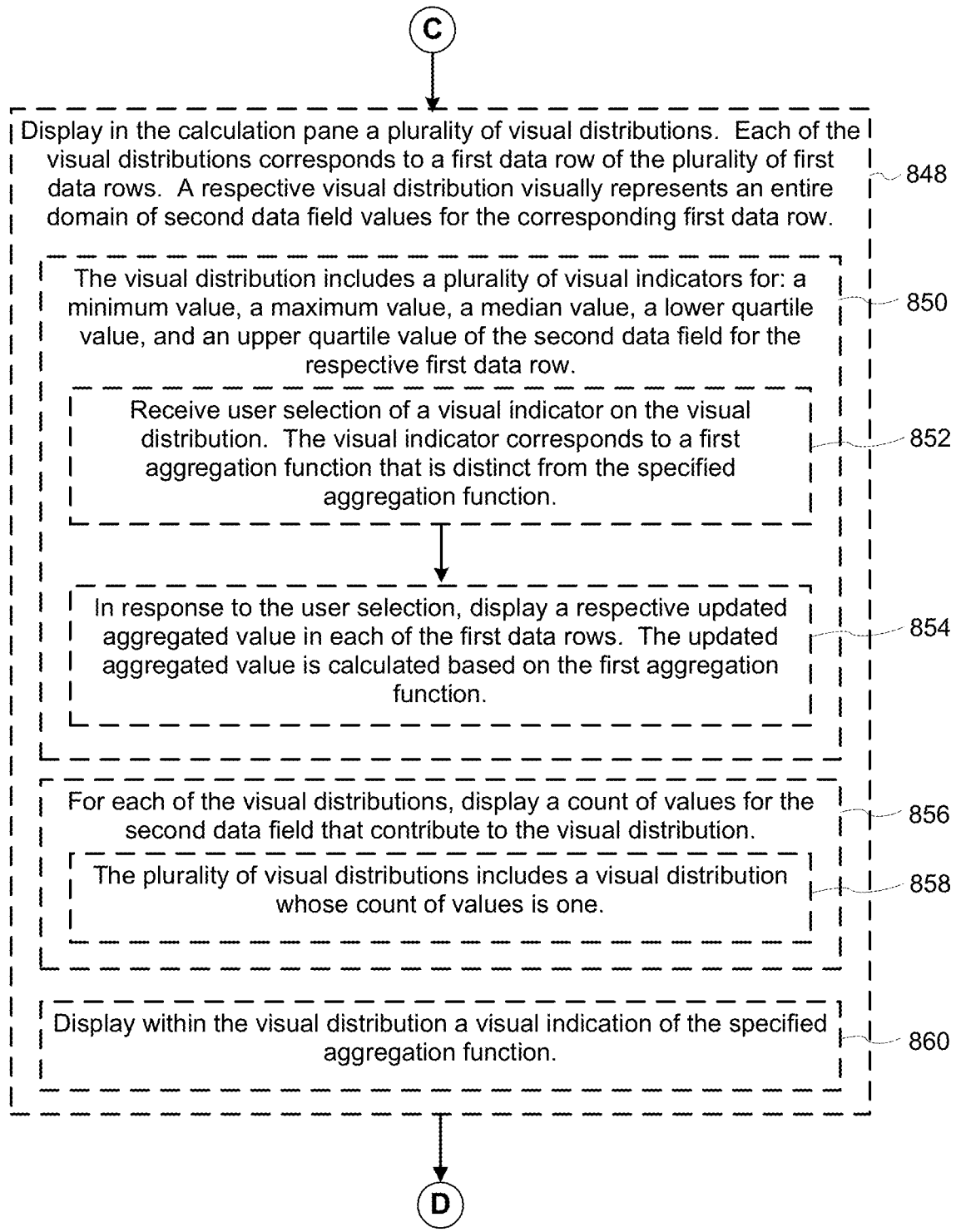
Figure 8E:
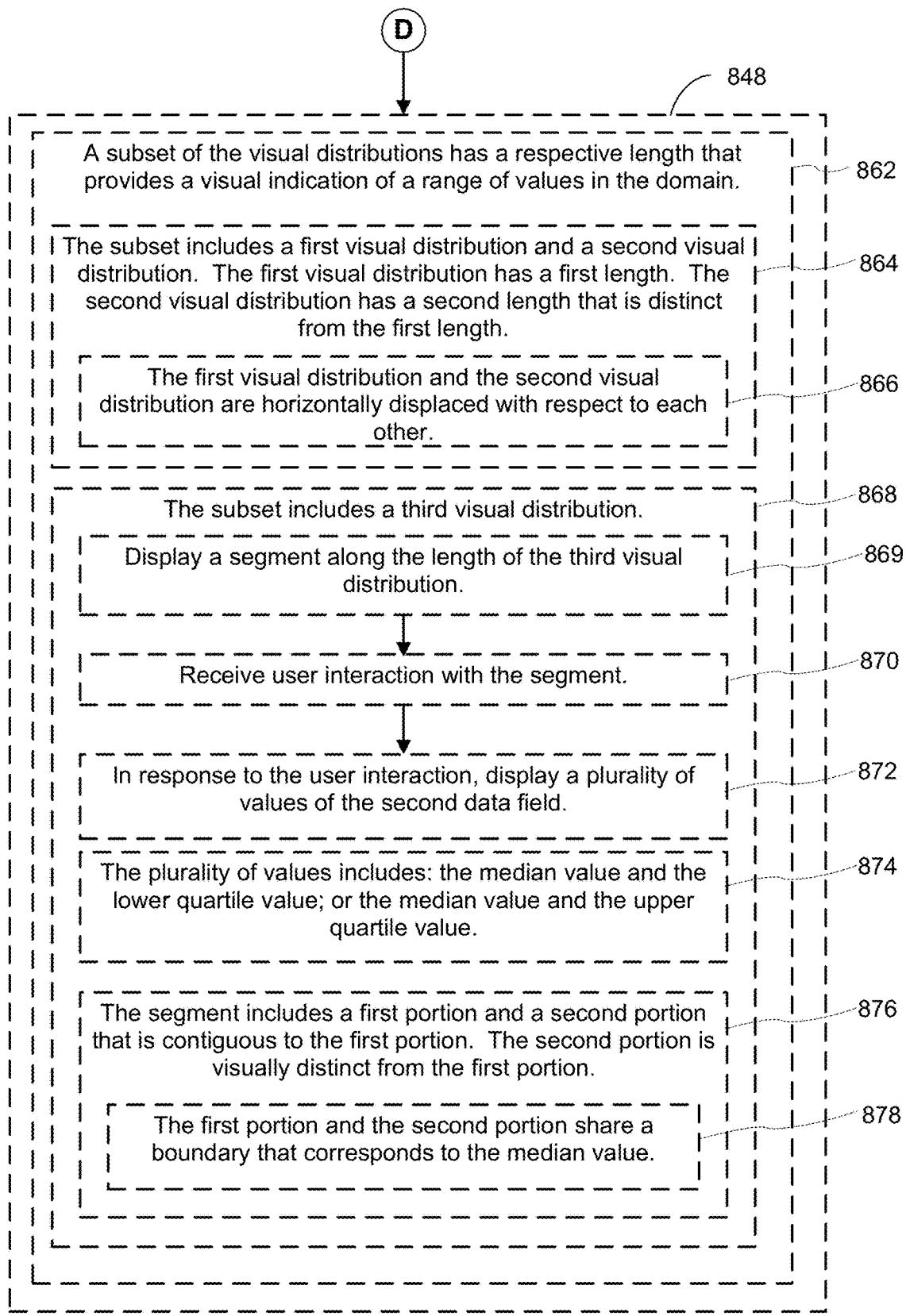
Figure 8F:
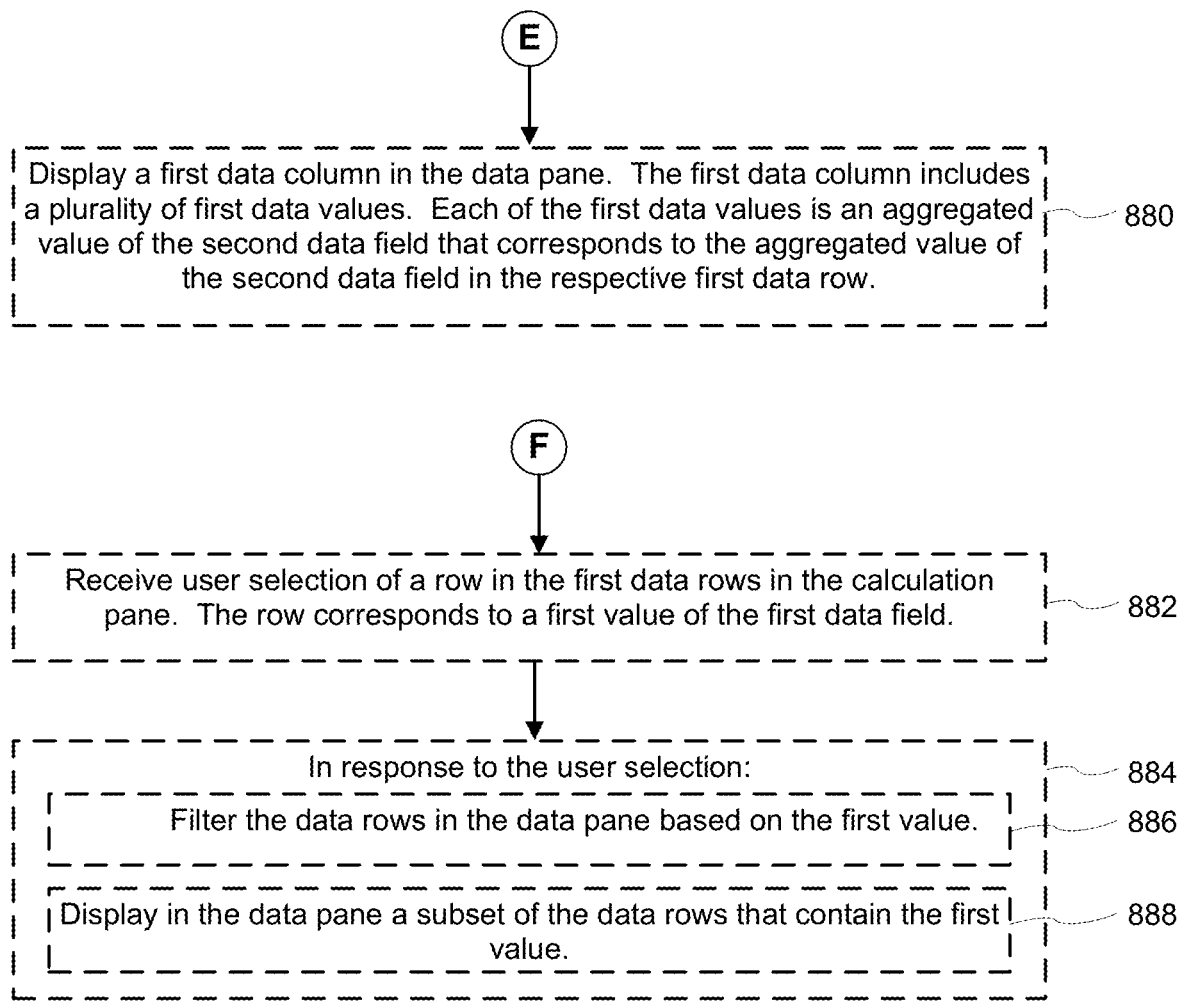
Figure 8G:
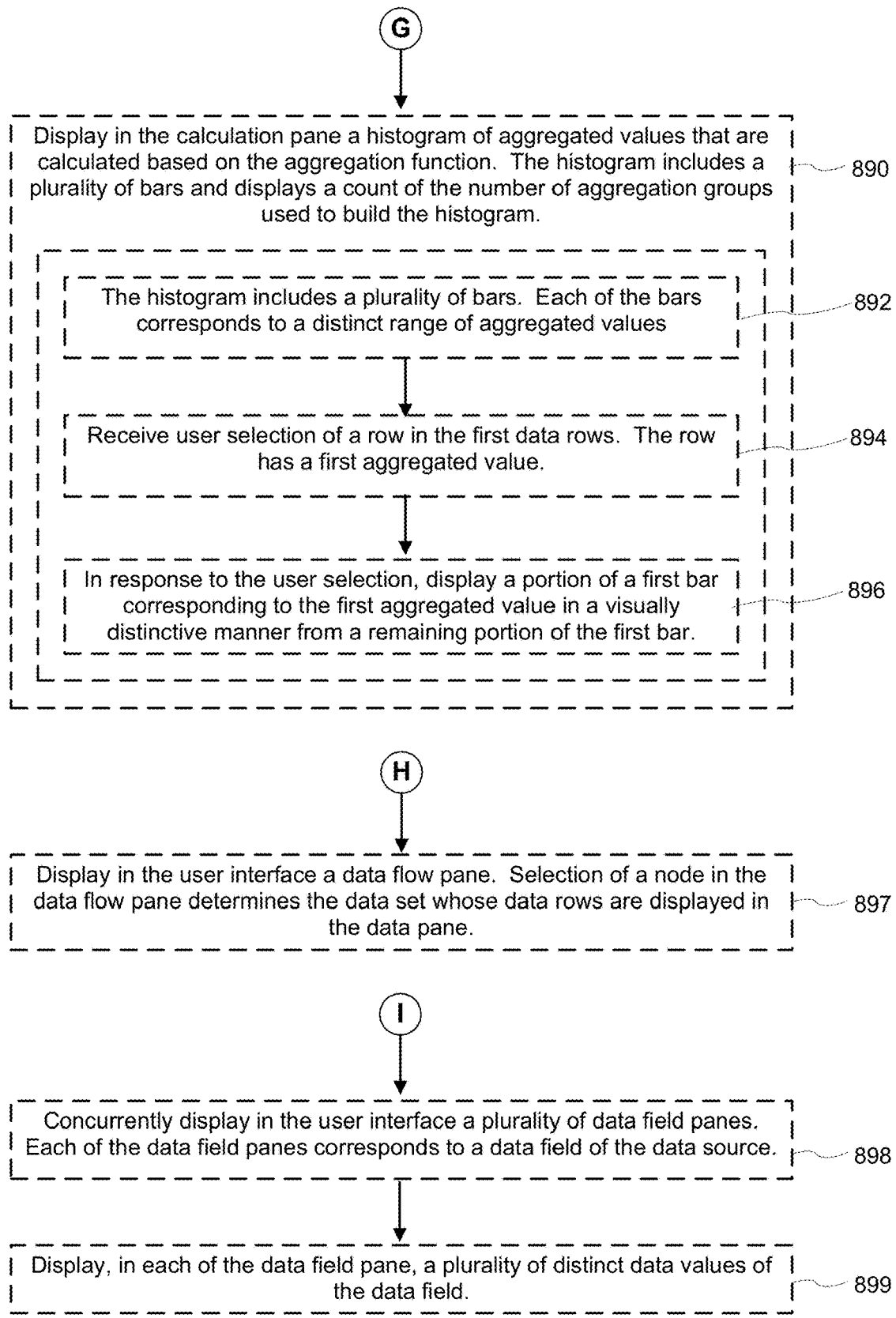

FIGS. 7A and 7B provide a series of screen shots for a graphical user interface according to some implementations.

FIG. 7A illustrates a user interaction with (e.g., hovering over) the visual indicator 536-20 of the visual distribution 530-20 corresponding to the maximum value of the aggregation group 510-20. In response to the user interaction, the calculation pane 330 displays a widget 702 that provides a visual indication of the maximum value ("MAX: 2.041").

FIG. 7B illustrates user selection of the visual indicator 536-20. In response to the user selection, the "open" circles 536 in FIG. 7A are closed in FIG. 7B whereas the "closed" circles 534 in FIG. 7A are "open" in FIG. 7B. The aggregation function is updated from "MIN" 506 to FIG. 7A to "MAX" 704 in FIG. 7B. The aggregated data column 308 is updated from minimum gas price values in FIG. 7A to maximum gas price values in FIG. 7B.

As illustrated in the examples of FIGS. 5A-5I, 6A-6C, 7A, and 7B, the inclusion of a calculation pane 330 in a data preparation application obviates the need for a user to write complex code. The calculation pane 330 enables a user to select data fields in the data source for grouping, partitioning, and aggregation. The visual distributions 530 provide the user with a view into the statistical distribution of the data aggregation. The user can quickly and conveniently identify outliers in the data aggregation using the visual distributions 530. The calculation pane allows the user to obtain statistical information on the fly, before committing to a particular aggregation during data preparation.

FIGS. 8A-8G provide a flowchart of a method 800 for building (802) table calculations during data preparation according to some implementations. The method 800 is also called a process.

The method 800 is performed (804) at a computing device 200 that has a display 212, one or more processors 202, and memory 206. The memory 206 stores (806) one or more programs configured for execution by the one or more processors 202. In some implementations, the operations shown in FIGS. 3, 4, 5A-5I, 6A-6C, 7A, and 7B correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 800 may be combined and/or the order of some operations may be changed.

The computing device 200 displays (808) a user interface 300 that includes a data pane 310 and a calculation pane 330. This is illustrated in FIG. 3.

The data pane includes (810) a grid comprising a plurality of data rows and a plurality of data columns. Each of the data columns corresponds (812) to a data field of a data source. Each of the data columns comprises (814) a field name. Each of the data rows comprises (816) a respective data value for each of the data columns.

For example, in FIG. 3, the data pane 310 includes a grid comprising a plurality of data rows 304 and a plurality of data columns 306. Each of the data columns 306 corresponds to a data field of a data source 238. Each of the data columns 306 comprises a field name. For example, the data column 306-1 has field name "date," the data column 306-2 has field name "Time Recorded," the data column 306-3 has field name "Name," the data column 306-4 has field name "Price," the data column 306-5 has field name "Zipcode," the data column 306-6 has field name "Address," and the data column 306-7 has field name "Gas Price," Each of the data rows 304 comprises a respective data value for each of the data columns 306.

The computing device 200 receives (818) a first user input in the calculation pane to specify a grouping on a first data field of the data source. For example, in FIG. 5A, the computing device 200 receives a first user input in the calculation pane 330 to specify a grouping on a first data field 502 "Address" of the data source 238.

The computing device 200 receives (820) a second user input in the calculation pane to specify an aggregation function on a second data field of the data source. For example, in FIG. 5A, the computing device 200 receives a second user input in the calculation pane 330 to specify an aggregation function 506 "MIN" on a second data field 508 "gas price" from the data source 238.

In some implementations, the first data field and the aggregation function are displayed (822) as user-selectable options in the calculation pane. This is illustrated in FIGS. 5A, 5B, and 5C.

In some implementations, the aggregation function is (824) one of: SUM, AVG, MEDIAN, COUNTD (e.g., count distinct function that returns a number of unique values in the column), MIN, MAX, STDEV, STDEVP (e.g., standard deviation of the population), VAR, and VARP (e.g., variance of the population). This is illustrated in FIG. 5C.

In response to (826) the first user input and the second user input, for each distinct value of the first data field, the computing device 200 aggregates (828) corresponding values of the second data field according to the aggregation function.

The computing device 200 displays (830) in the calculation pane a plurality of first data rows. Each of the first data rows corresponds (832) to a distinct value of the first data field. Each of the first data rows includes (834) a respective aggregated value that is calculated based on the aggregation function. For example, in FIG. 5A, the computing device 200 displays in the calculation pane 330 a plurality of first data rows 510. Each of the first data rows 510 includes a respective aggregated value 512 ("minimum gas price") that is calculated based on the aggregation function "MIN."

The computing device 200 saves (836) rows of data displayed in the calculation pane as a new data source. For example, in FIG. 5A, user selection of the affordance 519 "Done" enables the user to save rows of data (e.g., the data rows 510) displayed in the calculation pane 330 as a new data source. Additionally, or alternatively, the user may select "File→Save . . . " on the graphical user interface 300 (not shown) to save the rows of data displayed in the calculation pane 330 as a new data source.

In some implementations, the saved rows are (838) the first data rows.

In some implementations, the computing device 200 receives (840) a third user input in the calculation pane to specify one or more sub-groupings of the first data field according to a third data field of the data source. In response to the third input, the computing device 200 partitions (842) each distinct value of the first data field into one or more subgroups. Each of the subgroups corresponds (842) to a distinct value of the third data field. For each distinct pair of values of the first data field and the third data field, the computing device 200 aggregates (845) corresponding values of the second data field according to the aggregation function. The computing device 200 displays (846) in the calculation pane a plurality of second data rows. Each of the second data rows corresponds (846) to a respective distinct pair of values of the first data field and the third data field. The saved rows are (846) the second data rows.

For example, in FIG. 5A, the computing device 200 receives a third user input in the calculation pane 330 to specify one or more sub-groupings of the first data field "Address" according to a third data field "date" of the data source. In response to the third input, the computing device 200 partitions each distinct value of the first data field "Address" into one or more subgroups (e.g., different dates). Each of the subgroups corresponds to a distinct date. For each distinct pair of (address, date) data fields, the computing device 200 aggregates corresponding values of the second data field "gas prices" according to the aggregation function "MIN." The computing device 200 displays in the calculation pane 330 a plurality of second data rows 510. Each of the second data rows 510 corresponds to a respective distinct pair of values of the first data field "address" and the third data field "date." The saved rows are the second data rows.

In some instances, the partitioning further comprises sorting (844) the one or more subgroups according to values of the first data field and/or the third data field. For example, in FIG. 5A, the aggregation groups are sorted by address and date, with address being the first sort level. Within each address, the aggregation groups are sorted by date (e.g., in ascending order).

In some implementations, the computing device 200 displays (848) in the calculation pane a plurality of visual distributions. Each of the visual distributions corresponds (848) to a first data row of the plurality of first data rows (i.e., the aggregation groups). A respective visual distribution visually represents (848) an entire domain of second data field values for the corresponding first data row. For example, in FIG. 5, the computing device 200 displays in the calculation pane 330 a plurality of visual distributions 530. Each of the visual distributions 530 corresponds to an aggregation group (e.g., a first data row) 510 of the plurality of aggregation groups (first data rows). A respective visual distribution (e.g., the visual distribution 530-3 in FIG. 5D)

visually represents an entire domain of second data field "gas prices" values for the corresponding aggregation group 510-3.

In some instances, a visual distribution includes (850) a plurality of visual indicators for: a minimum value, a maximum value, a median value, a lower quartile value, and an upper quartile value of the second data field for the respective first data row. For example, in FIG. 5D, the visual distribution 530-3 includes a plurality of visual indicators for: a minimum value 534-3, a maximum value 536-3, a median value 543-3, a lower quartile value 541-3, and an upper quartile value 545-3 of the second data field "gas price" for the respective aggregation group 510-3.

In some instances, the computing device 200 receives (852) user selection of a visual indicator on the visual distribution. The visual indicator corresponds to a first aggregation function that is distinct from the specified aggregation function. In response to the user selection, the computing device 200 displays (854) a respective updated aggregated value in each of the aggregation groups. The updated aggregated value is (854) calculated based on the first aggregation function. For example, in FIG. 7A, the computing device 200 receives a user selection of a visual indicator 536-20 on the visual distribution 530-20. The visual indicator 536-20 corresponds to a first aggregation function "MAX," which is distinct from the specified aggregation function "MIN." As illustrated in FIG. 7B, in response to the user selection, the computing device 200 displays a respective updated aggregated value 512 in each of the aggregation groups. The updated aggregated value is calculated based on the first aggregation function "MAX."

In some instances, for each of the visual distributions, the computing device 200 displays (856) a count of values for the second data field that contribute to the visual distribution. For example, in FIG. 5D, for each of the visual distributions 530, the computing device 200 displays a count 539 of values for the second data field "gas prices" that contribute to the visual distribution 530.

In some instances, the plurality of visual distributions includes (858) a visual distribution whose count of values is one. This is illustrated in FIG. 5H.

In some instances, the computing device 200 displays (860) within the visual distribution a visual indication of the specified aggregation function. For example, in FIG. 5, the user-specified aggregation function is "minimum." The computing device 200 displays the visual indicators 534 in the form of closed circles, which are visually distinct from the "open" circles 536 that correspond to the maximum value.

In some instances, a subset of the visual distributions has (862) a respective length that provides a visual indication of a range of values in the domain. For example, in FIG. 5F, a subset of the visual distributions 530 has a respective length 532 that provides a visual indication of a range of values in the domain.

In some instances, the subset includes (864) a first visual distribution and a second visual distribution. The first visual distribution has (864) a first length. The second visual distribution has (864) a second length that is distinct from the first length. For example, in FIG. 5D, the subset includes a first visual distribution 530-3 and a second visual distribution 530-4. The first visual distribution 530-3 has a first length 532-3. The second visual distribution 530-4 has a second length 532-4 that is distinct from the first length.

In some instances, the first visual distribution and the second visual distribution are (866) horizontally displaced with respect to each other. For example, in FIG. 5D, the first visual distribution 530-3 and a second visual distribution 530-4 are horizontally displaced with respect to each other.

In some instances, the subset includes (868) a third visual distribution. The method 800 further includes displaying (869) a segment along the length of the third visual distribution. The computing device 200 receives (870) a user interaction with the segment. In response to the user interaction, the computing device 200 displays (872) a plurality of values of the second data field.

For example, in FIGS. 5D and 5E, the subset includes a third visual distribution. The method 800 further includes displaying (869) a segment along the length of the third visual distribution 530-1. The computing device 200 receives a user interaction with (e.g., hovering over) the segment 538-1. In response to the user interaction, the computing device 200 displays a plurality of values of the second data field "gas prices" via the widget 544 and the widget 546.

In some instances, the plurality of values includes the median value and the lower quartile value, or the median value and the upper quartile value. This is illustrated in FIGS. 5D and 5E.

In some instances, the segment includes (876) a first portion and a second portion that is contiguous to the first portion. The second portion is (876) visually distinct from the first portion. For example, in FIG. 5D, the segment 538-3 includes a first portion 540-3 and a second portion 542-3 that is contiguous to the first portion. The second portion 542-3 is visually distinct from the first portion 540-3 (e.g., has a different color).

In some instances, the first portion and the second portion share (878) a boundary that corresponds to the median value. For example, in FIG. 5D, the first portion 540-3 and the second portion 542-3 share a boundary 543-3 that corresponds to the median value.

In some implementations, the computing device 200 displays (880) a first data column in the data pane. The first data column includes (880) a plurality of first data values. Each of the first data values is (880) an aggregated value of the second data field that corresponds to the aggregated value of the second data field in the respective first data row. For example, in FIG. 3, the computing device 200 displays a first data column 308 in the data pane 310. The first data column 308 includes a plurality of first data values. Each of the first data values in the first data column 308 is the minimum gas price that corresponds to the minimum gas price value for the rows in a respective aggregation group 510.

In some implementations, the computing device 200 receives (882) user selection of a row in the first data rows (i.e., selection of an aggregation group) in the calculation pane. The row corresponds to a first value of the first data field. In response to (884) the user selection, the computing device 200 filters (886) the data rows in the data pane based on the first value. The computing device 200 displays (888) in the data pane a subset of the data rows that contain the first value. For example, in FIG. 6A, the computing device 200 receives user selection of a row (aggregation group) 510-1 in the first data rows 510 in the calculation pane 330. The row 510-1 corresponds to a first value of the first data field "Address" (and the third data field "Date"). In response to the user selection, the computing device 200 filters the data rows 304 in the data pane 310 based on the first value of the first data field "Address" (and the third data field "Date"). The computing device 200 displays in the data pane 310 a subset of the data rows 304 that contain the first value.

In some implementations, the computing device 200 displays (890) in the calculation pane a histogram of aggregated values that are calculated based on the aggregation function. The histogram includes (890) a plurality of bars and displays a count of the number of aggregation groups used to build the histogram. For example, in FIG. 5A, the computing device 200 displays in the calculation pane 330 a histogram 514 of aggregated values "minimum gas prices" that are calculated based on the aggregation function "MIN." The histogram 514 includes a plurality of bars (e.g., histogram bars 515) and the total number 516 of aggregation groups 510.

In some instances, the histogram includes (892) a plurality of bars. Each of the bars corresponds (892) to a distinct range of aggregated values. The method further includes receiving (894) user selection of a row in the first data rows (i.e., an aggregation group). The row has a first aggregated value. In response to the user selection, the computing device 200 displays (896) a portion of a first bar corresponding to the first aggregated value in a visually distinctive manner relative to the remaining portion of the first bar. This is illustrated in FIGS. 6A, 6B, and 6C.

In some implementations, the computing device 200 displays (897) in the user interface a data flow pane. Selection of a node in the data flow pane determines a data set whose data rows are displayed in the data pane. This is illustrated in FIG. 3, as well as in U.S. patent application Ser. No. 15/345,391, filed Nov. 7, 2016, entitled "User Interface to Prepare and Curate Data for Subsequent Analysis" and described in U.S. patent application Ser. No. 15/701,381, filed Sep. 11, 2017, entitled "Optimizing Execution of Data Transformation Flows," each of which is hereby incorporated by reference herein in its entirety.

In some implementations, the computing device 200 concurrently displays (898) in the user interface a plurality of data field panes. Each of the data field panes corresponds to a data field of the data source. The computing device 200 displays (899), in each of the data field panes, a plurality of distinct data values of the data field. This is illustrated in FIG. 4.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for building table calculations during data preparation, comprising:
   at a computing device having a display, one or more processors, and memory storing one or more programs configured for execution by the one or more processors:
      displaying a user interface that includes a data flow pane and a calculation pane, the data flow pane including a node/link diagram for a data prep flow;
      in response to user selection of a node in the node/link diagram, populating affordances in the calculation pane according to data fields of a data set associated with the selected node;
      receiving a first user input in the calculation pane to specify a grouping on a first data field of the data set;
      receiving a second user input in the calculation pane to specify an aggregation function on a second data field of the data set;
      in response to the first user input and the second user input:
         for each distinct value of the first data field, aggregating corresponding values of the second data field according to the aggregation function; and
         displaying in the calculation pane a plurality of first data rows, wherein each of the first data rows corresponds to a respective distinct value of the first data field and each of the first data rows includes a respective aggregated value that is calculated based on the aggregation function; and
      saving rows of data displayed in the calculation pane as a new data source.

2. The method of claim 1, wherein the saved rows are the first data rows.

3. The method of claim 1, further comprising:
   receiving a third user input in the calculation pane to specify one or more sub-groupings of the first data field according to a third data field of the data set; and
   in response to the third input:
      partitioning each distinct value of the first data field into one or more respective subgroups, wherein each of the subgroups corresponds to a respective distinct value of the third data field;
      for each distinct pair of values of the first data field and the third data field, aggregating corresponding values of the second data field according to the aggregation function; and
      displaying in the calculation pane a plurality of second data rows, each of the second data rows corresponding to a respective distinct pair of values of the first data field and the third data field, wherein the saved rows are the second data rows.

4. The method of claim 3, wherein the partitioning further comprises sorting the one or more subgroups according to values of the third data field.

5. The method of claim 1, further comprising displaying in the calculation pane a plurality of visual distributions, wherein each of the visual distributions corresponds to a respective first data row of the plurality of first data rows, and each visual distribution visually represents an entire domain of second data field values for the corresponding first data row.

6. The method of claim 5, wherein each visual distribution includes a plurality of visual indicators for: a minimum value, a maximum value, a median value, a lower quartile value, and an upper quartile value of the second data field for the respective first data row.

7. The method of claim 6, further comprising:
receiving user selection of a visual indicator on the visual distribution, wherein the visual indicator corresponds to a first aggregation function that is distinct from the specified aggregation function; and
in response to the user selection, displaying a respective updated aggregated value in each of the first data rows, wherein the updated aggregated value is calculated based on the first aggregation function.

8. The method of claim 5, further comprising:
for each of the visual distributions, displaying a count of values for the second data field that contribute to the visual distribution.

9. The method of claim 5, further comprising displaying within the visual distribution a visual indication of the specified aggregation function.

10. The method of claim 5, wherein a subset of the visual distributions has a respective length that provides a visual indication of a range of values in the domain.

11. The method of claim 10, wherein:
the subset includes a first visual distribution and a second visual distribution;
the first visual distribution has a first length; and
the second visual distribution has a second length that is distinct from the first length.

12. The method of claim 11, wherein the first visual distribution and the second visual distribution are horizontally displaced with respect to each other.

13. The method of claim 10, wherein the subset includes a third visual distribution, the method further comprising:
displaying a segment along the length of the third visual distribution;
receiving a user interaction with the segment; and
in response to the user interaction, displaying a plurality of values of the second data field.

14. The method of claim 13, wherein the plurality of values includes:
the median value and the lower quartile value; or
the median value and the upper quartile value.

15. The method of claim 13, wherein the segment includes a first portion and a second portion that is contiguous to the first portion, wherein the second portion is visually distinct from the first portion.

16. The method of claim 15, wherein the first portion and the second portion share a boundary that corresponds to the median value.

17. The method of claim 1, wherein the first data field and the aggregation function are displayed as user-selectable options of affordances in the calculation pane.

18. The method of claim 1, wherein the aggregation function is one of SUM, AVG, MEDIAN, COUNTD, MIN, MAX, STDEV, STDEVP, VAR, and VARP.

19. The method of claim 1, further comprising displaying, in the calculation pane, a histogram of aggregated values that are calculated based on the aggregation function, wherein the histogram includes a plurality of bars and displays a count of the first data rows.

20. The method of claim 19, wherein the histogram includes a plurality of bars, each of the bars corresponds to a distinct range of aggregated values, and the method further comprises:
receiving user selection of a row in the first data rows, wherein the row has a first aggregated value; and
in response to the user selection, displaying a portion of a first bar corresponding to the first aggregated value in a visually distinctive manner from a remaining portion of the first bar.

21. A computing device, comprising:
one or more processors;
memory coupled to the one or more processors;
a display; and
one or more programs stored in the memory and configured for execution by the one or more processors, the one or more programs comprising instructions for:
displaying a user interface that includes a data flow pane and a calculation pane, the data flow pane including a node/link diagram for a data prep flow;
in response to user selection of a node in the node/link diagram, populating affordances in the calculation pane according to data fields of a data set associated with the selected node;
receiving a first user input in the calculation pane to specify a grouping on a first data field of the data set;
receiving a second user input in the calculation pane to specify an aggregation function on a second data field of the data set;
in response to the first user input and the second user input:
for each distinct value of the first data field, aggregating corresponding values of the second data field according to the aggregation function; and
displaying in the calculation pane a plurality of first data rows, wherein each of the first data rows corresponds to a respective distinct value of the first data field and each of the first data rows includes a respective aggregated value that is calculated based on the aggregation function; and
saving rows of data displayed in the calculation pane as a new data source.

22. A non-transitory computer readable storage medium storing one or more programs configured for execution by one or more processors of a computing device, the one or more programs comprising instructions for:
displaying a user interface that includes a data flow pane and a calculation pane, the data flow pane including a node/link diagram for a data prep flow;
in response to user selection of a node in the node/link diagram, populating affordances in the calculation pane according to data fields of a data set associated with the selected node;
receiving a first user input in the calculation pane to specify a grouping on a first data field of the data set;
receiving a second user input in the calculation pane to specify an aggregation function on a second data field of the data set;
in response to the first user input and the second user input:

for each distinct value of the first data field, aggregating corresponding values of the second data field according to the aggregation function; and displaying in the calculation pane a plurality of first data rows, wherein each of the first data rows corresponds to a respective distinct value of the first data field and each of the first data rows includes a respective aggregated value that is calculated based on the aggregation function; and saving rows of data displayed in the calculation pane as a new data source.

* * * * *